(12) United States Patent
Rotherham

(10) Patent No.: US 11,325,701 B2
(45) Date of Patent: May 10, 2022

(54) AIRCRAFT PROPULSION SYSTEM, METHOD OF MANUFACTURE AND USE THEREOF

(71) Applicant: James Joseph Rotherham, Melbourne (GB)

(72) Inventor: James Joseph Rotherham, Melbourne (GB)

( * ) Notice: Subject to any disclaimer, the term of this patent is extended or adjusted under 35 U.S.C. 154(b) by 52 days.

(21) Appl. No.: 16/613,950

(22) PCT Filed: May 17, 2018

(86) PCT No.: PCT/GB2018/051336
§ 371 (c)(1),
(2) Date: Nov. 15, 2019

(87) PCT Pub. No.: WO2018/211279
PCT Pub. Date: Nov. 22, 2018

(65) Prior Publication Data
US 2021/0114726 A1    Apr. 22, 2021

(30) Foreign Application Priority Data

May 17, 2017 (GB) .................................. 1707951

(51) Int. Cl.
| | |
|---|---|
| *B64C 39/00* | (2006.01) |
| *B64F 5/10* | (2017.01) |
| *B64C 3/14* | (2006.01) |
| *B64C 29/00* | (2006.01) |

(52) U.S. Cl.
CPC ............ *B64C 39/003* (2013.01); *B64C 3/141* (2013.01); *B64C 29/00* (2013.01); *B64F 5/10* (2017.01); *B64C 2003/143* (2013.01)

(58) Field of Classification Search
CPC ....... B64C 39/003; B64C 3/141; B64C 29/00; B64C 2003/143; B64F 5/10
See application file for complete search history.

(56) References Cited

U.S. PATENT DOCUMENTS

| | | | | |
|---|---|---|---|---|
| 3,807,662 A | * | 4/1974 | Velazquez | B64C 27/82 244/17.19 |
| 2011/0123346 A1 | | 5/2011 | Greenblatt | |
| 2011/0123348 A1 | * | 5/2011 | Greenblatt | F04D 29/384 416/241 R |

FOREIGN PATENT DOCUMENTS

| | | |
|---|---|---|
| CN | 202 657 236 | 1/2013 |
| ES | 2 325 013 A1 | 8/2009 |
| ES | 2325013 * | 8/2009 |

* cited by examiner

*Primary Examiner* — Justin M Benedik
(74) *Attorney, Agent, or Firm* — Woodard, Emhardt, Henry, Reeves & Wagner, LLP

(57) ABSTRACT

The present invention provides a propulsion system for an aircraft. The system includes one or more thrust producing portions, wherein the one or more thrust producing portions include one or more duct means. The duct means are at least partially formed or defined by two or more substantially parallel wall members. At least one flapping or waving wing member is provided, at least partially located or positioned substantially within the one or more duct means, wherein the flapping or waving motion of the at least one wing member creates thrust, enabling the aircraft to fly in use.

20 Claims, 32 Drawing Sheets

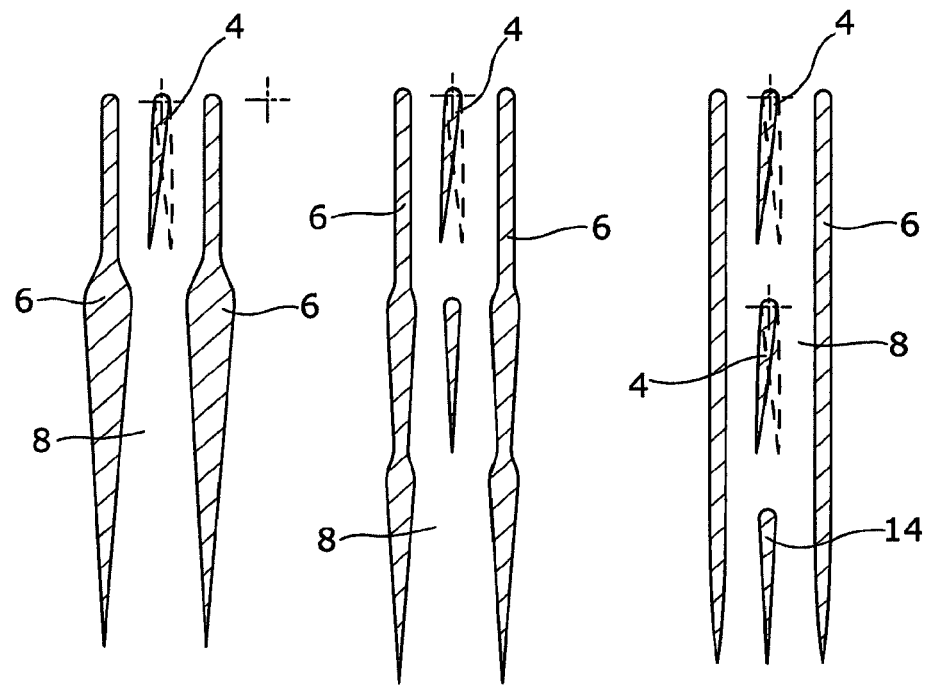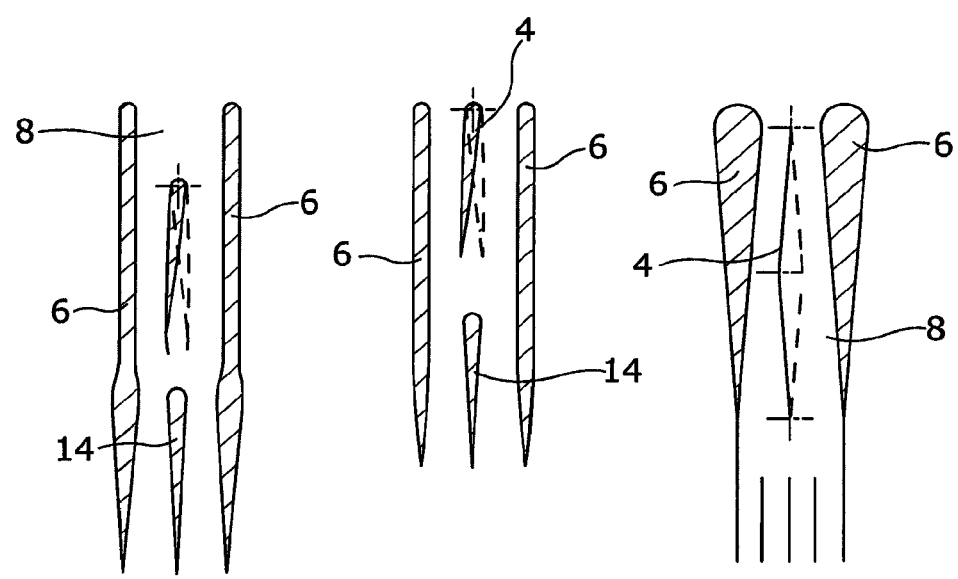
Figure 3

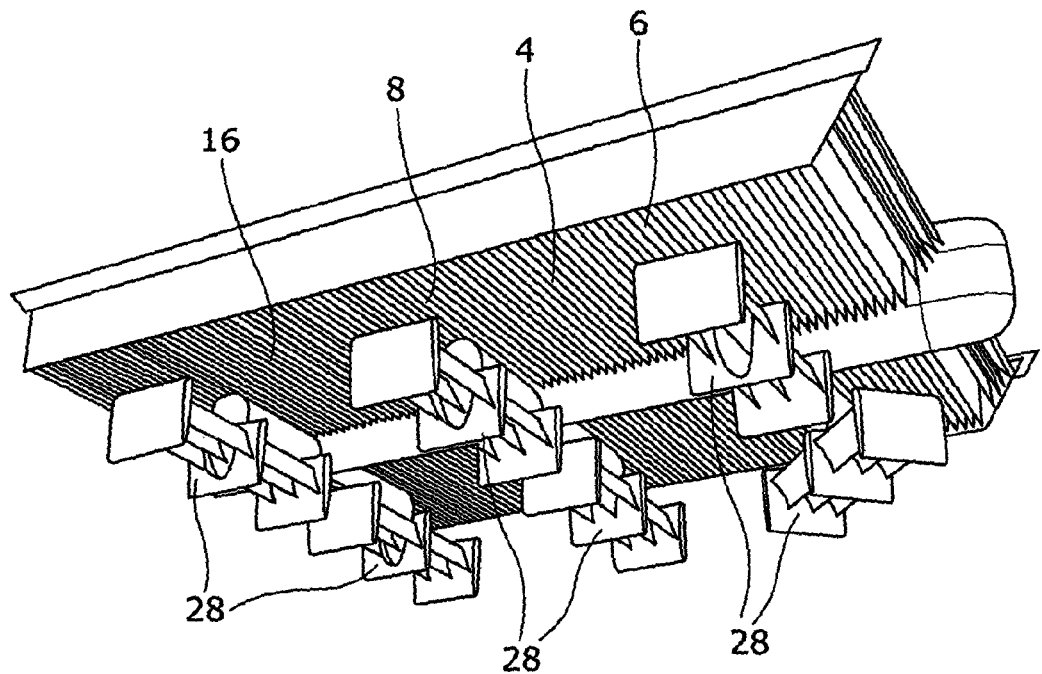
Figure 9
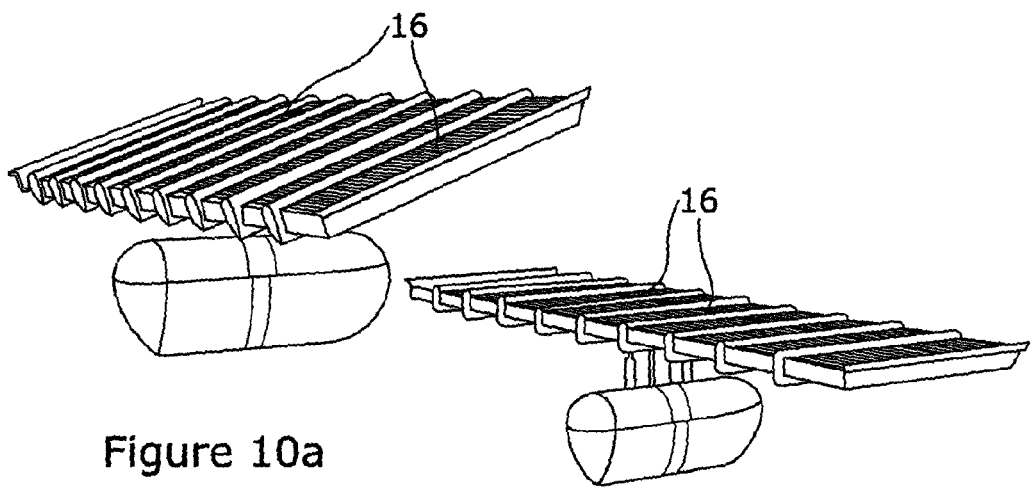
Figure 10a
Figure 10b

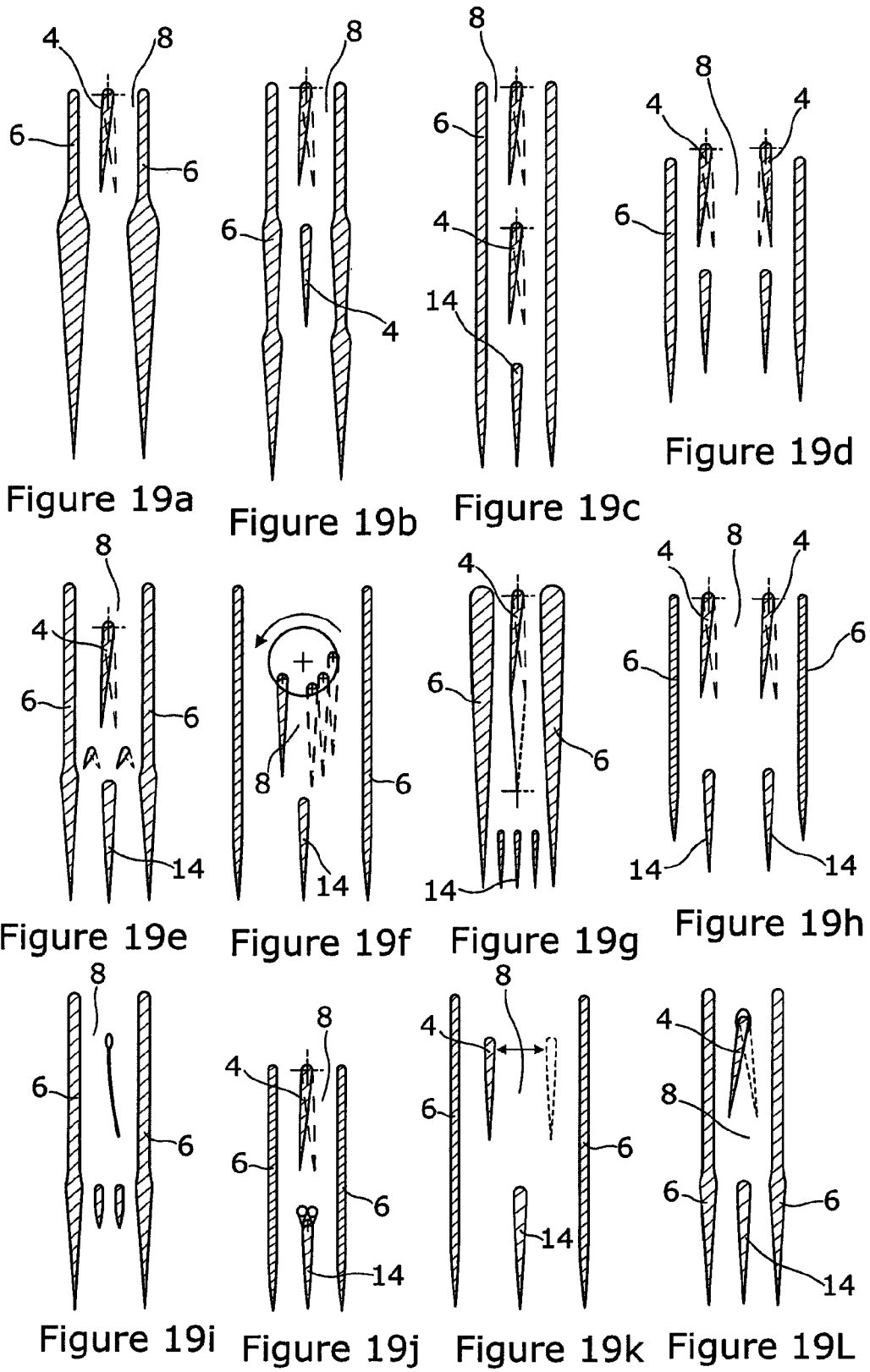

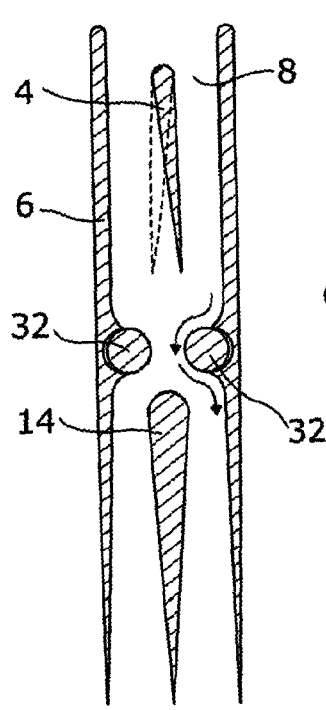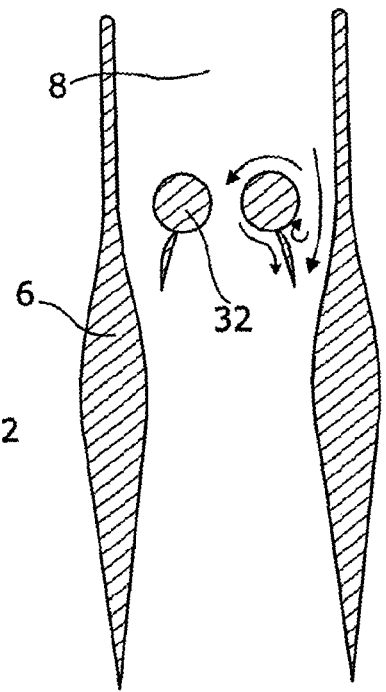
Figure 20b    Figure 20c
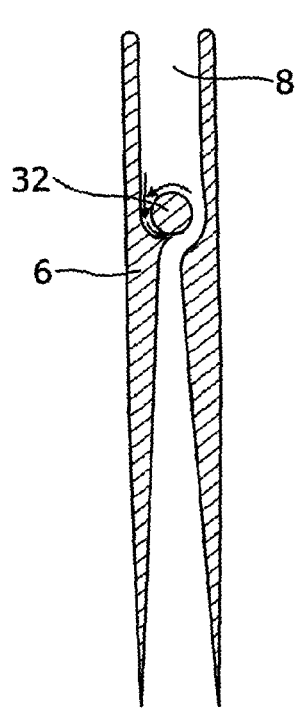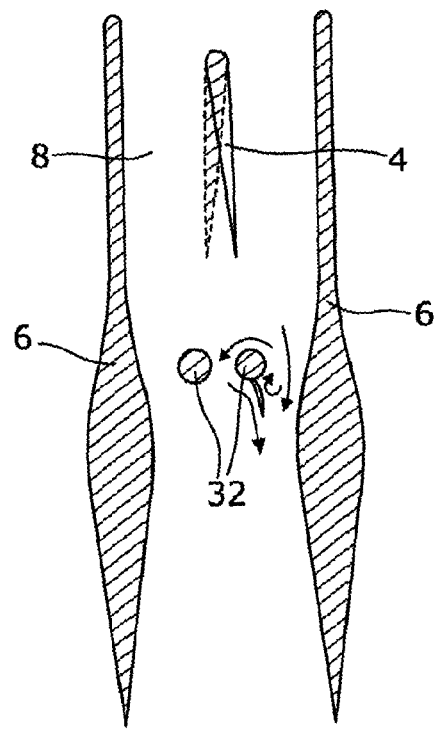
Figure 20d    Figure 20e

AIRCRAFT PROPULSION SYSTEM, METHOD OF MANUFACTURE AND USE THEREOF

The present invention concerns a propulsion system for an aircraft, particularly suited to vertical take-off and landing (VTOL). This can be used for, but not limited to; cargo and parcel delivery, commuting, intra-urban travel, ferry and bus services, emergency services, observation, telecommunications relays, recreation and sport, energy supply, battlefield supply and evacuation, building site lifting, tall building elevator alternative and agricultural uses.

VTOL aircraft would be able to solve the problem of traffic congestion in towns and cities. They are needed for faster, more versatile responses for emergency services and military. They are needed for observation purposes where conventional take-off aircraft lack the infrastructure to operate.

Access to some parts of the world, within a reasonable time frame and cost, is difficult without VTOL. However; noise, cost, aircraft footprint and safety issues have prevented greater adoption of such devices and so these problems remain unsolved for the majority of people and for a significant part of the world's surfaces.

Wings are the most efficient way to produce thrust, using air as the fluid medium. Vertical take-off has been most efficiently achieved using rotating wings (fans, propellers and rotors); however this method has the disadvantage of making significant amounts of noise, and can be dangerous, when the wings are exposed, because of the high rotational speeds reached. This problem becomes greater as the amount of thrust generated increases. It is also difficult to efficiently utilise all of the disc area swept out by the wings because of differences in angular velocity along the length of the wing and because of three dimensional aerodynamic effects that cause energy loss (in the form of vortices, which are also a major source of noise) near the wing tips. This results in reduced efficiency (for a specific area), large amounts of noise, and a larger aircraft footprint, which reduces the choice of landing sites and ease of storage.

The change in oncoming airflow velocity means that a rotating wing (propeller) must change its pitch to remain efficient across a range of air speeds. A helicopter must change the rotor blade pitch to avoid any imbalance caused by airflow velocity differences between the retreating and advancing blades. Dealing with these issues requires parts that add weight, cost and complexity.

Rotating wings also have the problem of 'vortex ring state', in which the descent velocity of the aircraft causes air to push up through the inner part of the rotor where less thrust is produced. This can result in a severe loss of lift.

The manufacture of an efficient rotating wing requires that the aerofoil is varied along the wing's length to cope with the changing angular velocity which, along with high wing loading and vibrational problems, increases the cost of manufacture.

Smaller VTOL aircraft, in the form of 'Multicopters', have become popular for many tasks owing to their low cost and ease of use. They cannot generally maintain suitable levels of safety or noise for general use as they become larger, nor are they efficient at transporting loads over longer distances because the rotors need to provide both the lift and forward thrust. This problem can be overcome by a combination of adding wings and by either rotating the propellers or using ones that are sized, and positioned, for forward flight; however this adds to the cost and complexity and still does not address noise and safety issues.

Computer programming advances will enable easy piloting of a single rotor, helicopter type device (which, owing to its large rotor diameter, is efficient in vertical flight). However it would still have multiple points that could cause total failure and it is likely that the mechanics of using a single lifting rotor will keep its cost high. In any case this would not address the issues of safety, footprint or noise.

The use of distributed propulsion, where multiple motors and fans are used with a suitably redundant power supply, will enable an overall increase in the system redundancy thus increasing safety. The noise will be likely to remain too great for regular operation in populated areas and the blades would still pose a danger to people and animals nearby.

Any system that uses a number of relatively small diameter propellers will not have a means of autorotating or descending at a safe speed in the event of a propulsive failure. Although a parachute may help in some cases there still tends to be a 'dead man' zone where the aircraft does not have enough height for a parachute or autorotation to function but is high enough to cause harm. In any case these systems add cost and complexity which reduces their desirability for a system intended for very wide use.

Ducted fans tend to add significant weight and create control problems (stemming from non-linear pressure changes over the duct edge and moment drag) and are expensive due to their three dimensional shape and engineering requirements. Although a duct can reduce noise, the relatively small diameter at which they must be built (owing to the added weight) means they require more power which can cause an increase in noise.

Within a rectangular area a rotary wing system can only ever reach $\pi/4$ of the area of a rectangular system (without the use of a specially designed duct) which reduces efficiency, and increases disc loading, for a specific rectangular area (which is an important metric for operations in urban areas or for storage).

Reducing the exposure of a rotating wing, to the extent that noise and safety concerns are significantly mitigated, can lead to efficiency, control and weight problems. The use of a duct causes difficulties in control when in a crosswind, or as the duct moves forward, and the use of protective elements (such as a shroud, netting or bars) tend to obstruct the airflow which reduces efficiency. Both solutions add weight and neither is very effective at significant noise reduction, although a properly fitted duct will help.

It is therefore the objective of this invention to provide a propulsion system for an aircraft that addresses the above-mentioned problems.

It is a further aim of the present invention to provide an aircraft that includes a thrust producing device with reduced exposure of highly energetic moving parts, reduced cost, reduced noise and to maintain acceptable levels of efficiency and weight, and therefore of cruise speed, load and range.

It is a yet further aim of the present invention to provide an aircraft capable of a safe descent in the event of a total systems failure.

In the first aspect of the invention there is provided a propulsion system for an aircraft, said system including one or more thrust producing portions, wherein said one or more thrust producing portions include one or more duct means, said duct means at least partially formed or defined by two or more substantially parallel wall members, characterised in that at least one flapping or waving wing member is at least partially located or positioned substantially within said one or more duct means wherein the flapping or waving motion of the at least one wing member creates thrust, enabling the aircraft to fly in use.

As such, when the flapping or waving wing member flaps or waves it creates alternating high pressure, decreasing cavities and low pressure, expanding cavities between at least part of the flapping wing member and the duct means walls. The overall volume of the duct means and the included angle between the wing member and both the duct walls remains substantially constant.

Typically, the duct means wall members at least partially define an air inlet into the duct means and/or an air outlet out of the duct means. Further typically the flapping or waving wing member is located within the duct substantially between the inlet and outlet.

In a preferred embodiment all of the flapping or waving wing member is located or contained within the duct means. The presence of the duct walls has been shown to greatly increase efficiency.

Typically, air flows from the inlet towards the outlet because a thrust producing vortex stream is created, downstream of the flapping or waving wing member, by the flapping action of the same (Knoller-Betz effect) which creates pressure changes acting on the surface of the wing member and duct means wall members. This is sometimes known as a Karman reverse vortex street. The duct means walls bound the action of the flapping wing member by creating a duct or passage which causes it to experience an angle of attack relative to the duct means wall member surface (ground effect). The presence of the duct walls also helps prevent boundary layer separation in forward motion and helps to keep the mechanism simple by avoiding the need for adjusting the median wing pitch relative to the oncoming free flow airstream.

In one embodiment the flapping or waving wing member is a substantially symmetric or symmetrical aerofoil. Typically when viewed along the latitudinal axis the flapping or waving wing member is substantially a symmetric aerofoil, teardrop or pendant shaped in cross section. As such, the shape of the flapping wing member creates a divergent shape, when symmetrically positioned, between the wall members at least partially defining the duct means and the wing member in the direction of the outlet.

The skilled person will appreciate that the angle of divergence between the wing and wall is also never so great as to allow flow separation caused by the change of pressure. These angles contribute to determining the maximum amplitude that can be used for a given flapping or waving wing chord. The maximum amplitude reached by the wing can also be dependent on the proximity of the duct wall and the effect of this on efficiency.

An included angle of about 20 degrees has been found to be one of the more optimal angles, however there are other angles that can be used, for example a greater angle can produce more thrust with the same overall duct wall proximity (although this tends be at the expense of efficiency). Some efficient proportions are indicated in the drawings but these can change according to different conditions and needs.

The flapping or waving wing members include front or leading edges positioned at and/or substantially towards the duct means inlet. The flapping or waving wings members include at least one trailing or rear edges wherein said wing members are positioned or orientated such that the trailing or rear edges are substantially downstream of the inlet and leading wing edge, substantially towards and/or at the duct means outlet.

Typically at least the trailing or rear edges of the flapping or waving wing members move with a waving or flapping motion whilst the wing member remains fixed to a point and/or axis substantially at, or towards, the leading edge when viewed along a latitudinal axis of the wing member.

In one embodiment the trailing edges are deformable and/or flexible. In one embodiment the trailing edges are serrated.

Typically, the flapping or waving motion of the flapping or waving wing member is a pivoting or partial rotational movement about an axis. Typically, the axis of rotation and/or pivot is located substantially at, or at least towards the front edge of the flapping or waving wing member. Further typically, the profile of the front portion or leading edge of the flapping wing member appears substantially stationary when viewed along the pivot point or rotational axis whilst the rear or tail of the flappable wing oscillates within the duct means.

In a preferred embodiment of the invention at least a first or further thrust producing portions include a plurality of substantially parallel wall members, said wall members at least partially defining a plurality of duct means.

Typically, each duct includes at least one flapping or waving wing member.

In one embodiment, the aircraft includes an array of ducts arranged in at least one row and/or at least one column. Typically, the plurality of ducts is arranged in an array.

The use of an array, preferably consisting of as many efficiently sized, mechanically viable duct means or ducts as is appropriate for the aircraft design, allows the thrust to be more evenly spread out, and avoids the need for the depth of the duct means to be very large (as would be the case if one or a relatively small number were to be used for a proportionally large thrust area). So any thrust area can be created independently of the size of the area created at the front, rear and sides of the array. This helps to reduce drag and control problems. A larger number of duct means or ducts allow greater control from changes in thrust by individual duct means or duct means pairs, triples or more, and can better avoid inertia and vibrational problems stemming from the flapping action of the flapping or waving wing member. It also means that there is less loading on each flapping or waving wing member and also the wing span to thrust ratio can be increased which is quieter and more efficient. So an array can enable the ducts to be optimally proportioned whilst covering a larger thrust area. Individual duct inlet area can be sized to reduce access to energetic moving parts.

In one embodiment the wall members substantially defining the duct means or walls defining the plurality or array of duct means are spaced substantially equidistantly. Further typically, the flapping or waving wing members are located or positioned substantially equidistantly from the duct walls.

In one embodiment the length and shape of duct means substantially between the flapping or waving wing member and the outlet contributes to ensure that there is a pressure gradient that favours the passage of air from the inlet to the outlet. Typically it maintains a volume of low pressure air that draws more air down into the duct means and allows for greater mixing of higher and lower energy air. This is sometimes known as a jet ejector.

Further typically greater or longer duct means length and/or shape can be used to assist in equalizing the flow velocity across the outlet, thereby increasing efficiency.

Typically the presence of the duct means wall members increases the air pressure changes created by the flapping wing member. This can increase the efficiency and reduce the flapping frequency for a given thrust. The wall members defining the duct means experience a similar change in pressure on their surface to that on the flapping wing member (depending on their proximity) so they help reduce the flapping frequency (for a given thrust) and therefore reduce potential mechanical problems. The walls effectively cause the flapping or waving wing member to act as if the amplitude has been increased, this helps reduce the need for an additional heaving motion for the wing and thus reduces the mechanical complexity. They can also perform the function of a wing spar, wing box or as part of any fuselage (reducing weight and complexity) and help shield the flapping wing members from objects and people on the ground.

The distance between the duct walls and wings has been shown to increase efficiency at a distance with optimal wing flapping amplitude and wing to wall distance. The proximity also depends on the need to keep skin friction losses and drag to minimum.

The use of an array of wing and duct combinations can help to keep a desirable pressure distribution on the rearwards facing sides of the first member when it is in forward motion. This is because the pressure created within the duct means can help prevent boundary layer separation.

In one embodiment at least one of the thrust producing portions or arrays is aligned or positioned in a direction to produce thrust to assist in vertical takeoff and/or landing. Typically the thrust producing portions are positioned in a horizontal or substantially horizontal plane. Further typically the thrust produced from the vertical or substantially vertical ducts is in a downwards direction.

In one embodiment at least one of the thrust producing portions or arrays is aligned or positioned in a direction to produce thrust to assist cruising flight. Typically the thrust producing portions are positioned in a vertical or substantially vertical plane. Further typically the thrust produced from the horizontal or substantially horizontal ducts is in a sideways direction.

In one embodiment the system includes at least two thrust producing portions or arrays. In one embodiment one or more thrust producing portions or arrays can be used for takeoff or landing and/or one or more thrust producing portions can be used for cruising or directional flight.

In one embodiment one or more of the thrust producing portions and/or array of duct means are movable. Typically at least one thrust producing portions and/or array of duct means is selectively movable or can be tilted.

In one embodiment the thrust producing portions located or positioned substantially perpendicular to the oncoming airflow can act like conventional wings with a circulation control element.

In one embodiment the angle of the thrust producing portions are angled so that an array of such parts is facing the oncoming flow at an oblique angle. This can help compromise between VTOL and cruise requirements, especially where a system of turning vanes are used to turn the jet to better suit the flight conditions and thrust requirements. The drag created in cruise can be reduced and the problem of flow detachment from the duct and wing leading edges can be mitigated along with control and efficiency issues.

To deal with the problem of undesirable pressure changes at the rear of an array, especially an array using a shorter wing span, an aerodynamically shaped fairing is proposed. This can allow the airflow from both the freestream and the duct exit to avoid stall and unwanted turbulence.

At the rear or front of an array the ducts can be made to converge or diverge so that a radial arrangement is created. This can allow any oncoming airflow to access the ducts more easily and also helps reduce drag and prevents flow detachment, especially on the rearmost surface of an array. This arrangement can also be used to provide more forward thrust in cruise.

The use of duct means aligned with the direction of cruising flight means that increasing the depth of the duct means channel is possible without increasing the drag and control problems caused by the size of the front and rear wall members defining the duct means when the ducts are perpendicular to the direction of flight. There would still be an increase in the area of the side of the duct array in this case.

The distance between the duct means leading edge and the leading edge of the flapping wing member may affect the pressure on the rear facing surfaces in horizontal flight and so needs to be taken into consideration, especially in relation to the cruise speed. This is due to the variations in pressure caused by the flapping or waving action and constraints imposed by the duct means walls. The shape of the duct leading edges can be adapted to suit forward flight conditions better; for example by curving the leading part of the duct towards the oncoming airflow, or angling the whole array forward and then curving the duct exit to the desired angle.

In a preferred embodiment of the invention, the system includes at least one stator or static wing member located substantially downstream from the flapping or waving wing members. Typically, the static wing member is located substantially within the duct means.

In one embodiment the static wing member is located at the outlet of the duct means and/or a spaced distance from the same.

In one embodiment the wall members defining the duct means, or surfaces thereof, can taper and/or diverge.

In one embodiment the distance between adjacent wall members, or surfaces thereof, reduce and/or taper substantially at or around a region downstream of the flapping or waving wing member. Typically the surfaces of adjacent wall members taper at a point substantially between the flapping wing member and the static wing member. Further typically the surfaces of the wall members taper or converge at a point near to and/or substantially upstream of the fixed wing or stator member.

The area of the duct means walls, or wall members defining the duct means, near to the stator or static wing member leading edge can be shaped to reduce the flow separation and vorticity at the stator leading edge. By narrowing the channel between the duct walls and stator the pressure can be managed to help reduce vorticity and to help prevent the flow from detaching.

In one embodiment at least part of, or the entire, static wing member is located substantially outside the duct means, downstream from the outlet.

The jet created downstream of the flapping wing member has a latitudinal velocity/vortical component that reduces the efficiency. The placement of a static wing member or stator vane substantially at the center of the duct means, downstream of the flapping or waving wing member acts to reduce this vorticity/velocity, thereby straightening the flow to increase the efficiency (Katzmayer effect). Also, in an array of ducted wing sets or members it is advantageous to avoid having vortices exiting the duct interfering with one another. The straighter flow will cause less turbulence downstream of the outlets and increase efficiency.

The addition of more stators, smaller than the main one, and located roughly equidistant between the stator and duct wall at a distance substantially downstream of the main stator leading edge can increase the efficiency by further reducing the vorticity. The effect of these on the airflow, their interaction with the vorticity, is similar to the main stator and it may be assumed that a larger system could benefit from repeating this arrangement a number of times. The value of adding these additional stators is dependent on the thrust producing system requirements and size.

In one embodiment, at least a part of the duct means is shaped to act as a diffuser means. Typically, said part of the duct means is adjacent the stator. Preferably, a lower section of the duct means is shaped to act as a diffuser means. Further typically, said lower section of the duct means is shaped to diverge (or become wider) towards a bottom part thereof. This consequently provides a diffuser section for pressure recovery and to equalize the velocity/flow distribution across the duct.

In one embodiment the aircraft includes a fuselage means, cabin and/or pod means for the location of one or more flight control means, persons and/or cargo. Typically, the fuselage means is located substantially centrally on or within one or more thrust producing portions.

In one embodiment the cabin means is for the accommodation of one or more persons. Typically if the aircraft is manned the cabin means provides accommodation for one or more pilots.

In one embodiment, the cabin means is substantially surrounded by a first thrust producing portion and/or first and further thrust producing portions.

In one embodiment the thrust producing array/s are arranged to be able to accommodate a modular cargo that could be rapidly changed.

In one embodiment, at least a first thrust producing portion and/or one or more arrays includes endplates. Typically the endplates are positioned such that they are above the level of a duct means inlet and/or flappable wing member leading edges.

The positioning of the endplates above the level of the duct can be used to create a lower pressure area to help avoid flow separation within the duct. This means can effectively create a single rectangular shaped duct by creating a significant proportion of the lift on the end plate leading edge.

In one embodiment a strip of material is located substantially outside and towards the top of the endplates. This assists in reducing control problems arising from side winds. This is because the gap between the strip of material and the endplates prevents the side wind from being drawn directly into the duct means. A side wind drawn directly into the duct means would create a lift force over the edge, which could change abruptly if a stall occurs. A thinner endplate leading edge would also help with this problem since less lift would be able to develop on a thinner edge.

In one embodiment the endplates help to reduce 3 dimensional effects (vortices) being generated at the wing tips, which helps increase efficiency and reduce noise.

Pressure changes are developed equally along the whole wing span, (unlike a propeller where the pressure and flow velocity changes towards the tip, leading to stronger tip vortices). This is potentially more efficient than a propeller for a given span and will also help reduce noise. However, it is still desirable to locate the endplate as close as is practical to the wing to reduce the three dimensional effects that remain.

In one embodiment vane means are located substantially beneath or in the outflow of the one or more thrust producing portions. Typically the vane means can be used downstream of an array for control or propulsive purposes and also for causing the jet to diverge in such a way that the downwash is more spread out, to help avoid ground disturbance. The end plates can also be used to alter the jet, for example to expand or contract the jet.

In one embodiment, the flapping frequency of the flapping or waving wing members can be varied, controlled and/or predetermined for controlled flight purposes. Typically the arrays or flapping frequencies of the wing members within the arrays can be controlled.

Flight control can be achieved by controlling the flapping frequency or flapping cycle of one or more flapping wing members, or banks or arrays of the same.

Unlike a propeller, the flapping frequency can also be used to maintain efficiency and control throughout a range of oncoming airflow speeds without the need to change the wing pitch (where variable pitch control would be used for a propeller or cyclic for a helicopter rotor). It may be possible to change the amplitude to further alter the conditions to better suit cruise or for greater thrust for example.

In one embodiment, the flappable and/or partial rotational movement of the flapping wing is induced or caused by at least one cam and/or drive shaft arrangement.

When a typical rotating electric motor is used as the primary motive power the flapping or waving wing members are paired or preferably connected in three or more. If a linear motor or piezoelectric actuators are used then the connectivity of the wings will alter accordingly. Typically the angle of attack of the flapping wing members must be set so that the motor loading remains constant (as the wing reverses its direction and changes speed). An appropriate cam would ensure this action. This also helps to use energy stored as momentum in the wing itself.

In one embodiment the cam system is coupled to an energy storage system, springs and/or the like.

Typically a cam can be shaped to help reduce effects of inertia and to produce acceleration at the optimal timing in the flapping cycle. This can be designed to correlate with the wing mass and any springs or energy storage systems used.

In one embodiment the system includes at least one cam and crank shaft to impart the flapping, waving or heaving motion on the flapping or waving wing members. Typically one or more flapping wing members are attached to the crankshaft via a spindle or axle and/or the like. Further typically the flapping wing members are mounted on a spindle which is attached to one end of a crankshaft.

In one embodiment the cam and crank shaft arrangement includes a pair of magnet means. Typically the magnet means is a pair of permanent magnets.

Typically the permanent magnets are fitted to a second end of a crankshaft which works with and/or is in communication with the cam. Further typically the cam and magnet coupling functions as a conductor disk, creating an electrodynamic bearing.

Typically the cam is made of an appropriate material such as aluminium, copper and/or the like.

Further typically the cam is shaped to provide a sinusoidal motion according to the desired cyclical acceleration and amplitude of the flapping or waving wing members.

Typically the magnetic coupling ensures there is little or no friction in the cam/bearing device and it avoids the need for sets of roller bearings, springs and/or the like. It also reduces noise and vibration.

Typically a motor is linked to at least one flapping wing members in order to keep the motor more equally loaded. Avoiding springs is useful since they tend to store energy as the angle of deflection increases which is a point in the cycle when the motor is already doing a lot of work. This therefore requires extra energy and the motor power would need to be increased. In addition, a spring can only be optimized for one set of conditions. They could however be useful in helping recover energy lost to inertia.

The use of conductor disks or grooves located on a single spindle allows for any number of wings to be operated off a single motor.

The geometry of the duct means and wings members can work so that the flapping element is essentially two dimensional, for example by using piezoelectric parts for the wing. The aerodynamics remains much the same.

Where electric motors are used it is useful to have the flapping wing sized so a spindle can fit into the leading edge, thereby distributing the torque equally down the wing span. If piezoelectric actuation is used then different geometry may be required.

A person skilled in the art will appreciate that a number of different types of actuator can be used including, but not limited to, piezo-electrics, linear motors, magnets, or conventional cam systems of the type used in internal combustion engines.

The person skilled in the art will appreciate that it is possible to create 'harmonizing' sets of ducts means whose flapping wing member coordination would work in harmony; however this would remove the possibility of using the individual ducts for control purposes since the flapping frequencies would need to be linked.

If a wing were to have an additional heaving motion it may be possible to increase efficiency by coordinating the interaction between the leading edge and trailing edge vortices.

It could also be possible to fit boundary layer control devices to the stator leading edge that would help mitigate the creation of vortices in that area.

The work of the flapping action is assisted by the wall members defining the duct walls, which act to optimise the changes in pressure created by the flapping wings and increase efficiency. If the duct walls were absent more moving wings would be required which would add weight and cost. In the absence of duct walls the changes in frequency of different wing sets (necessary for control) would randomly create different angles between adjacent wings, so if the flapping phases amplitude of two wings become more in or out of phase then the pressure produced will change, and therefore efficiency and thrust.

The active wing generally uses only a flapping action without having a heaving action. This is to avoid leading edge separation and vortices in both static and forward flight. It also avoids complex and heavy mechanisms that need to deal with forces created from having two axes of movement. The duct walls are important in helping to increase the width of the jet produced by the flapping wing, thus avoiding the need for a heaving motion. It is however possible to make use of a heaving action, on its own or with a correlating oscillating action, in conjunction with a duct.

Pressure considerations, created by the presence of the duct, limit the angle of divergence and therefore the flapping amplitude. However, the use of a flexible trailing edge can increase the wing chord, without increasing the amplitude. In this case the flexible component would, on average, aim to remain roughly parallel with the duct walls.

If certain forms of piezoelectric actuation are used (or other mechanisms), in which active elements are located across the wing surface, it may be possible to control the shape of the flapping and/or flexing in a manner that would similarly increase the chord without the amplitude, or could otherwise increase efficiency or thrust.

In one embodiment a serrated wing trailing edge is formed on the flapping and/or static wings. Typically the trailing edge is flexible and/or ridged/serrated, which could help with noise reduction.

In one embodiment a series of leading edge bumps, sometimes known as 'tubercles', can be used on the wing, duct or stator leading edges.

A system including a number of wing/ducts has a high solidity (lifting surface to thrust area). The high number of lightly loaded wings means that there is a lower energy/wing area ratio. This reduces both the noise and the manufacturing cost (since the wings experience less force they require less high performance materials or complex engineering). It increases safety because less energy is transmitted to anyone, or anything, coming into contact.

In a preferred embodiment the fuselage means and/or endplates can also be shaped for control purposes.

The duct means widths and overall proportions of an array can be sized such that it will 'auto-rotate' during an unpowered descent and therefore slow the descent to a safer speed. In this case the flapping action of the wings will extract energy from the air flowing up through the array.

The endplates can be adapted to have an unfoldable surface that can be opened out during an unpowered descent to increase drag and further slow the descent. This could make used of the strips outboard of the endplates to help secure the flap in place.

The sizing of the ducts may also be influenced by the desire to reduce accessibility to the moving parts.

The length of the wing in relation to the thrust area over which it acts can be sized to be considerably greater than the span of an equivalent rotor blade. This is useful for efficiency and noise reduction.

If the wing span becomes very long it may be necessary to add extra bearings at intervals down the length to help prevent problems with vibrations and unwanted oscillations.

In one embodiment one or more of the duct means and/or wings members are aligned with the oncoming airflow. Typically this can reduce drag to enable higher cruising speed. Further it also reduces potential problems arising from leading edge flow separation. In this embodiment the moving wing and stator can be fixed to a wing or other suitable aerodynamic structure to reduce the drag, or control problems, created by the oncoming airflow.

An array attached to a wing can be used for vertical or very short take off and can prevent stall, especially in the case of a tilting wing aircraft design.

Typically in the embodiment where the majority or all of the duct means and/or wings are aligned with the oncoming airflow, there are no end plates and the ends of the flapping wings need to be shaped accordingly. Further typically the flapping wings and duct means are not used to create lift in forward flight and conventional wings or pure thrust are needed to generate lift.

In one embodiment the flapping wing elements may be arranged in parallel and/or series as necessary for control, aerodynamic or construction purposes.

In one embodiment one or more conventional propellers may be used to provide forward or other directional thrust.

In one embodiment the duct means array can be tilted and/or the thrust producing portion tilted to produce forward thrust or non-vertical thrust. Alternatively or additionally vanes are used to provide forward thrust, and/or direct the thrust.

In one embodiment the aircraft includes an undercarriage. In one embodiment the undercarriage includes cushioning means, such as springs, air-damping conduits and/or the like to cushion or otherwise soften a landing from an unpowered or underpowered descent.

The skilled person will also appreciate that the propulsion system described above may have significant usage not only in aircraft designs, as mentioned, but also in the design and manufacture of domestic fans, industrial fans, air conditioning units, ventilation systems and/or the like.

In one embodiment one or more duct means includes one or more Magnus effect devices such as rotating or rotatable cylinders, belts and/or the like. Typically the rotational speed of the cylinders can be selected and/or controlled thereby used to selectively create lift or thrust. Further typically an array of duct means including cylinders are used.

Typically the rotational speed of the cylinders can be used for control, both by varying the jet velocity of each duct means containing a cylinder, and/or by varying the cylinder rotational speeds within an individual duct means, thereby diverting the jet at the duct means outlet or exit. Further typically the thrust needed for forward flight (or sideways flight, depending on array position) can be attained without needing to tilt the array or use control vanes.

Typically any appropriate Magnus effect device, including spaced disks (Thom rotors) or a moving belt, can be used to achieve the above effects of the rotating cylinder.

In one embodiment when the Magnus effect device is used in conjunction with a flapping or waving wing member it can act in place of, or in addition, to the role of the stator or static wing member. Typically such a device can also act as a control means. Further typically it can act to enhance the thrust already created from the flapping wing and so can increase the overall thrust.

Typically it can also be used for fine control and for additional redundancy. Further typically it could be used for portions of the flight where noise reduction is a priority.

It can also be used as a means of boundary layer control to enable different duct exit geometries and/or to shorten the duct length (in this case part of the high energy boundary layer attached to the cylinder is 'peeled' off by and appropriately shaped edge and deflected off onto the desired boundary layer control surface. The low pressure created by the rotating cylinders means they can also work as a type of jet ejector.

In one embodiment one or more rotating cylinders are placed in a duct with a shaped plate located on the downstream side close to the cylinder. This plate is submersed within the boundary layer so as to divert part of the boundary layer downstream. This jet of higher velocity air is directed in such a way as to mix with the lower energy air in the duct. This 'entrained' air increases the volume of air flowing through the duct. The duct is shaped (typically by being narrower) to facilitate this along with a diffuser section for pressure recovery and to equalize the velocity distribution across the duct. The duct may also allow for a wider section between the cylinder and wall. The flow in that area would then be slower and this would reduce losses stemming from interaction with the flow being entrained into the boundary layer (which is in an upstream direction at the point between the cylinder and the wall).

The rotating cylinder concepts can be used in conjunction with any of the oscillating wing concepts and can also work on their own in a similar arrays.

In a second aspect of the invention there is provided an aircraft, said aircraft including one or more duct means, said duct means at least partially formed or defined by two or more wall members, characterised in that at least one flapping or waving wing member is located or positioned substantially within said one or more duct means wherein the flapping or waving motion of the at least one wing member creates thrust.

In a third aspect of the invention there is provided a method of manufacturing a propulsion means or system suitable for use with an aircraft, said system including one or more duct means, said duct means at least partially formed or defined by two or more substantially parallel wall members, characterised in that at least one flapping or waving wing member is located or positioned substantially within said one or more duct means wherein the flapping or waving motion of the at least one wing member creates thrust, said method of manufacture including the step of extruding or pultruding one or more wall members and/or wing members.

Typically said propulsion means can be molded and/or 3D-printed.

In one embodiment an aerofoil or wing like structure is used to hold or structurally support the duct means and/or flapping or waving wing members. Typically this arrangement is favoured when an array is forward aligned and a fuselage means and/or end plates cannot do this task. Further typically this structural wing or aerofoil structure can also be used for lift in forward flight.

In a further aspect of the invention there is provided a cam system, said system including at least one cam or conductor disc and a crank shaft wherein said crankshaft is coupled to the cam or conductor disk via one or more magnetic means.

Typically said magnetic means is a permanent magnet, or pair of permanent magnets.

A similar system utilizing a recessed motion track and a crankshaft with suitable bearings may be used.

Specific embodiments of the invention are now described with reference to the following figures wherein:

FIGS. 1a-5c illustrate views of one or more thrust producing portions of a propulsion system, in accordance with embodiments of the present invention;

FIGS. 6a-14b illustrate views of aircraft utilising a propulsion system, in accordance with embodiments of the present invention;

FIGS. 15a-21b illustrate views of flapping portions of wings, including cam and crankshaft arrangements for driving the waving or flapping, in accordance with embodiments of the present invention.

Flapping wing devices for use with turbines and propulsion have been attempted many times. However, the devices created are too heavy, too inefficient, or too complex or would require problematically high flapping frequencies to be successful as an aeronautical propulsion system. None of them have an effective, inherent means of control. Systems that use a heaving action for the wing, especially in addition to a flapping action require more axes and/or more weight to avoid vibrations and problems arising from shear forces. They also encounter aerodynamic complexities stemming from vortex formation and separation at the leading edge. An isolated flapping wing or array of such, without the benefits of appropriate ducting would be inefficient and could have no effective inherent control (use of flapping frequency to change thrust for control purposes). The use of an array of ducted flapping-only wings means that a heaving motion is not necessary and yet a large, controlled thrust area can be achieved. It is possible to create an array of un-ducted flapping wings that could produce thrust however this is less practical and would likely require an additional control system.

Figure 1A:
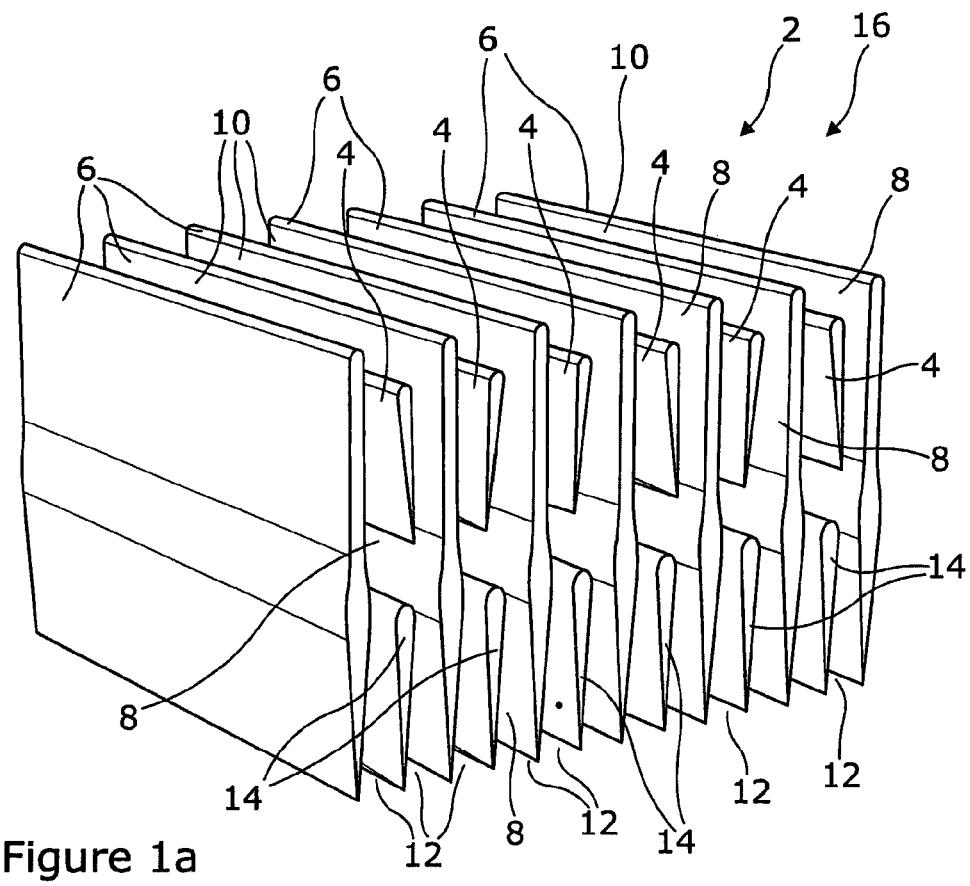

As such, the present invention concerns aircraft and specifically new propulsion system for said aircraft. FIG. 1a shows a preferred embodiment of the system 2 which includes flapping wings 4 located in-between walls 6, running substantially parallel and of the same length, thereby forming an array of substantially rectangular ducts 8. When the wings flap they create alternating high pressure, decreasing cavities and low pressure, expanding cavities between said wing 4 and the wall 6 surfaces. The overall volume of the duct and the included angle between the wing and both the walls remains constant.

In use, air flows from the inlets 10 towards the nozzles 12 because a thrust producing vortex stream is created, downstream of the wings 4, by the flapping action of the same (Knoller-Betz effect) which creates pressure changes acting on the surface of the wings and duct walls 6. This is sometimes known as a Karman reverse vortex street. The duct walls 6 bound the action of the flapping wing by creating a duct 8 which causes it to experience an angle of attack relative to the duct wall surface (ground effect), this helps prevent boundary layer separation in forward motion and helps to keep the mechanism simple by avoiding the need for adjusting the median wing pitch relative to the oncoming free flow airstream. The shape of the wing 4 creates a divergent shape between the duct and the wing in the direction of the nozzle 12. The angle of divergence changes with the wing's oscillating motion.

The vortices created downstream of the wing 4 have a latitudinal velocity component that reduces the efficiency. The placement of a stator vane 14 at the centre of the duct downstream of the wing acts to reduce this vorticity, straightening the flow to increase the efficiency (Katzmayer effect). Also, in an array 16 of wing sets it is advantageous to avoid having vortices exiting the duct 8 interfering with one another. The straighter flow will cause less turbulence downstream of the nozzles 12 and increase efficiency.

When a rotating motor is used as the primary motive power the wings 4 must be at least paired, and preferably arranged in three, and the angle of attack of the wings must be set so that the motor loading remains constant (as the wing reverses its direction and changes speed). An appropriate cam 18 would ensure this action.

The work of the flapping action is assisted by the duct walls 6 which act to optimise the changes in pressure created by the flapping wings 4. FIG. 1a shows duct walls the surface of which is contoured to optimise flow. In the absence of duct walls 6 the changes in frequency of different wing sets (necessary for control) would randomly create different angles between adjacent wings, so if the flapping phases amplitude of two wings become more in or out of phase then the pressure produced will change, and therefore efficiency and thrust.

Figure 1B:
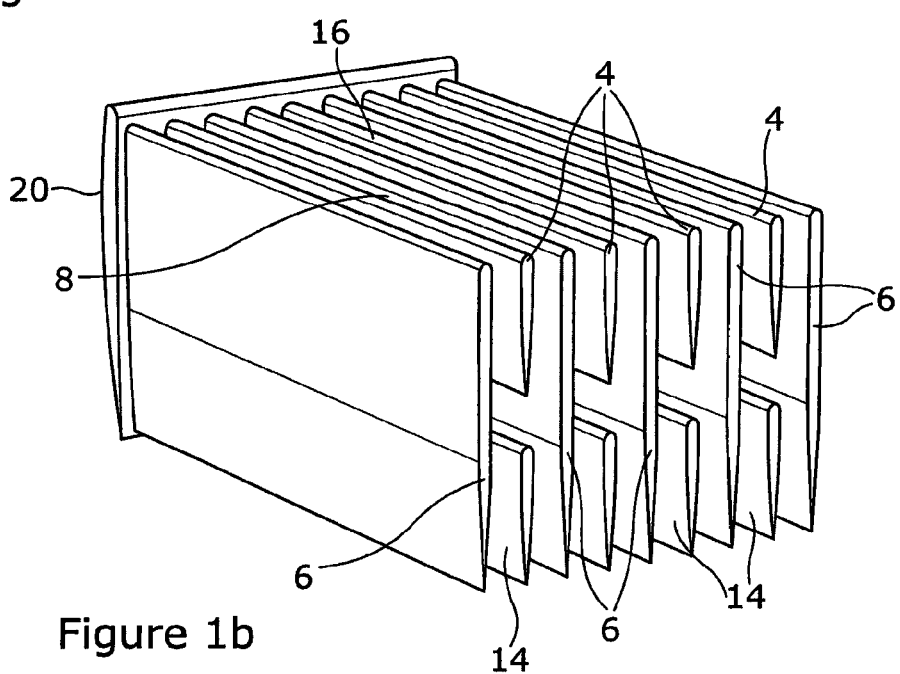

FIG. 1b shows an embodiment where the wall 6 are not as contoured and the wings 4 are set a little further into the duct 8. The duct end plate 20 helps to maintain structural rigidity. This also acts as housing for the spindle and in this example links the multiple ducts 8 together to increase the structure's rigidity and reduce its weight.

If the end plate 20 structure is raised above the height of the duct inlet it can be used to create a volume of low pressure above the inlet array that would help reduce the possibility of airflow stalling at the wing or duct leading edges.

Figure 1C:
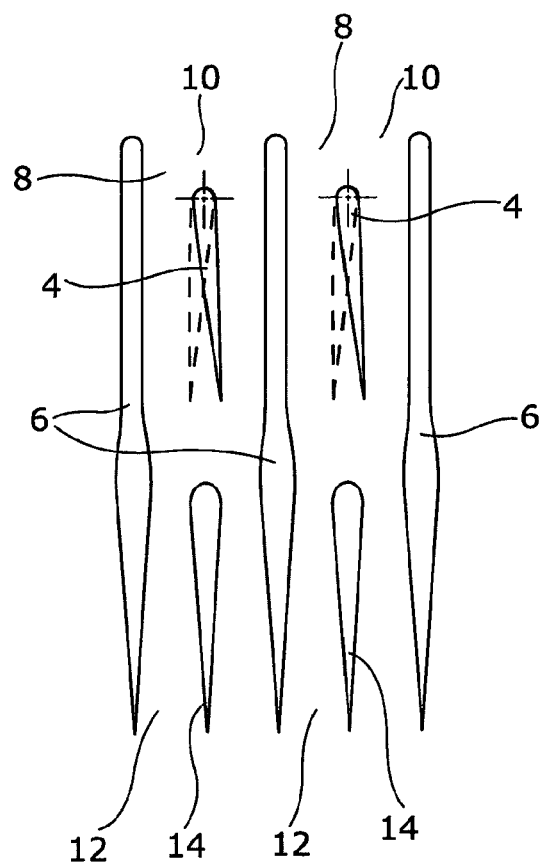
Figure 1D:
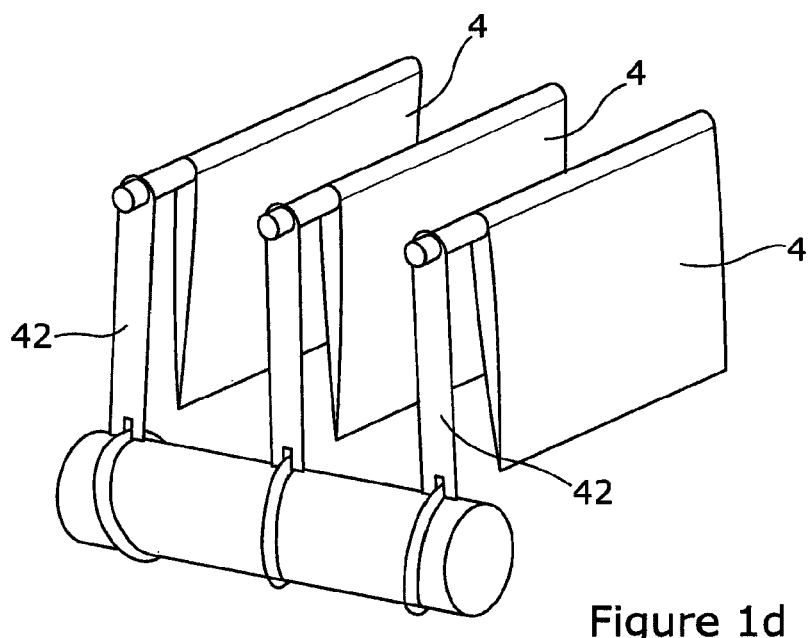
Figure 2:
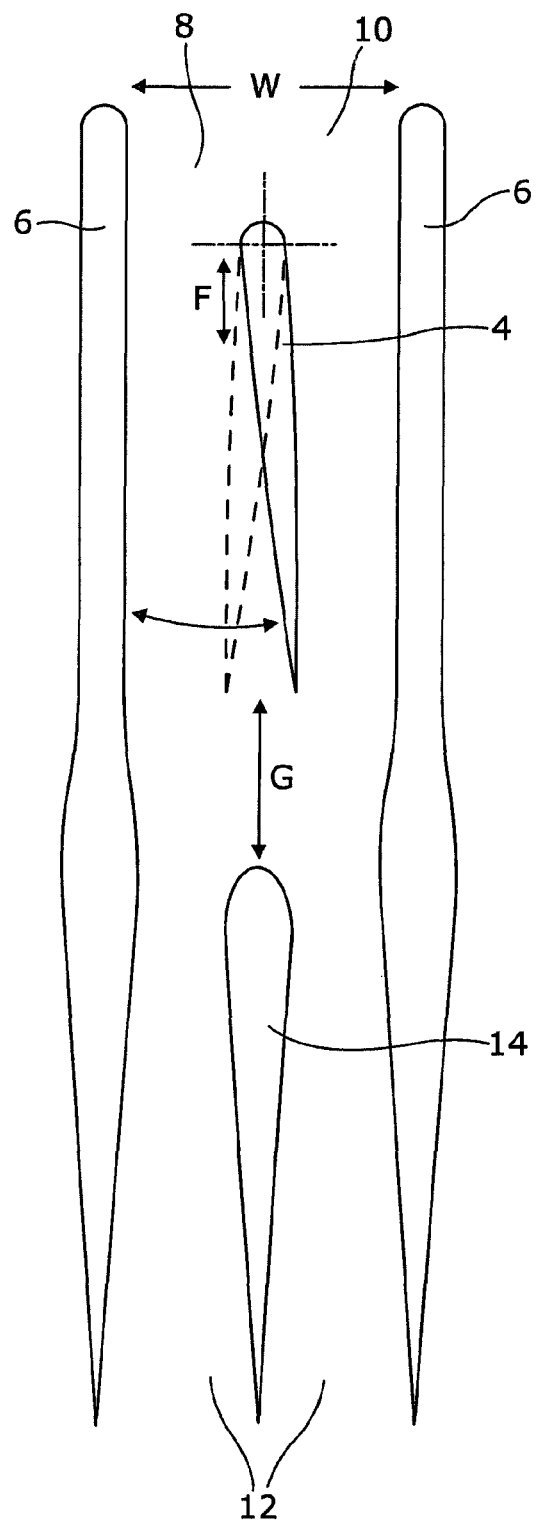
Figure 4A:
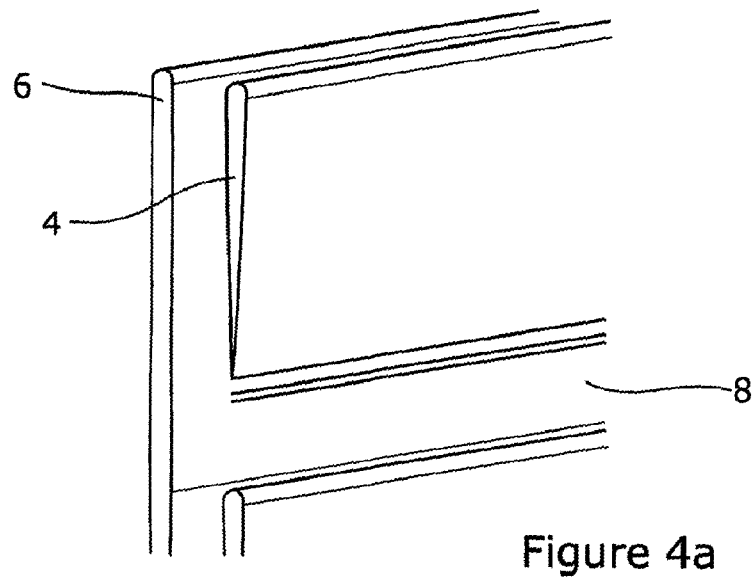
Figure 5A:
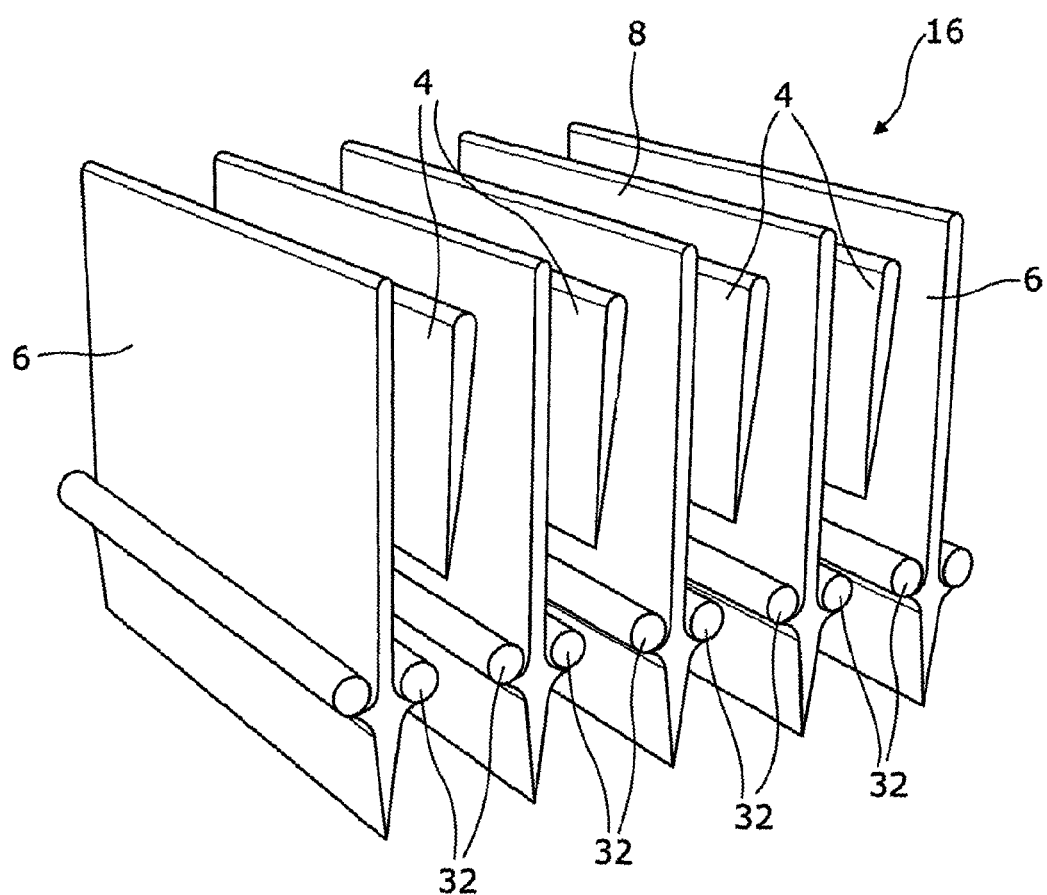
Figure 4B:
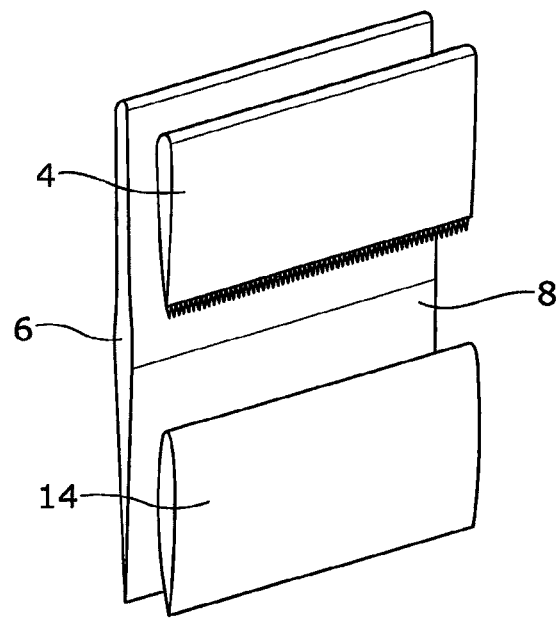
Figure 4C:
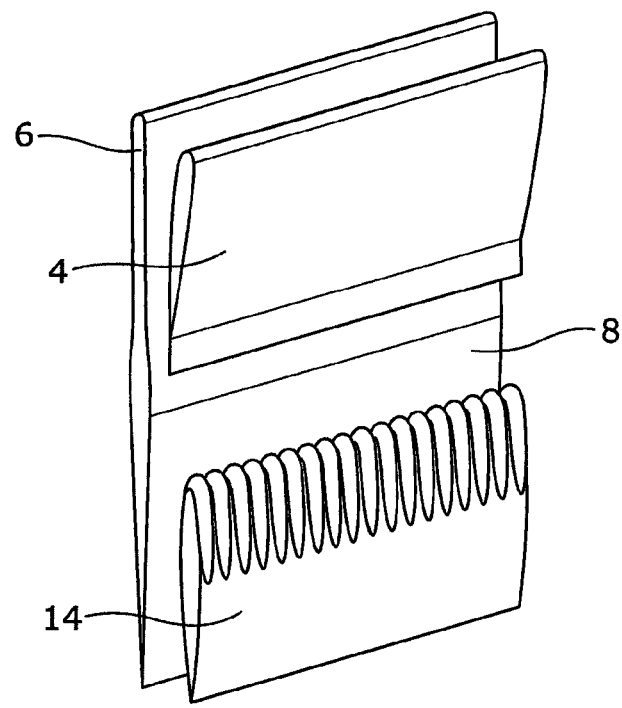
Figure 5B:
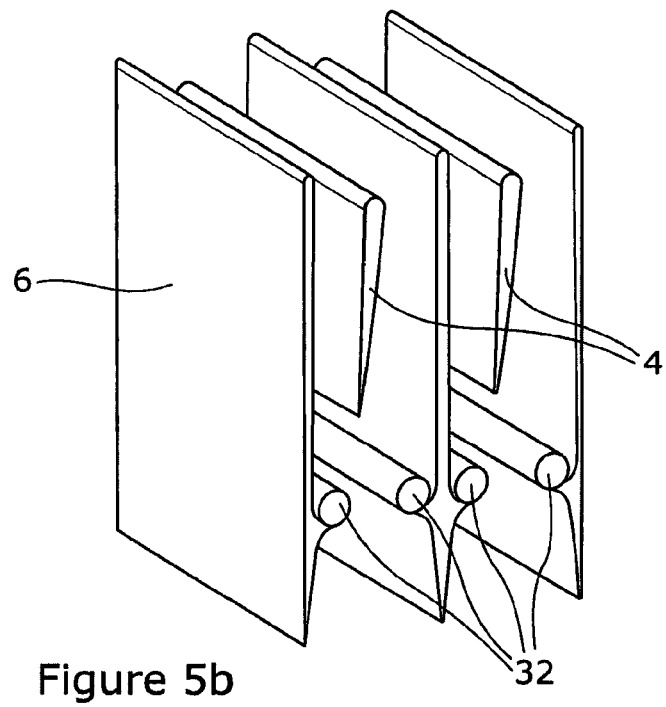
Figure 5C:
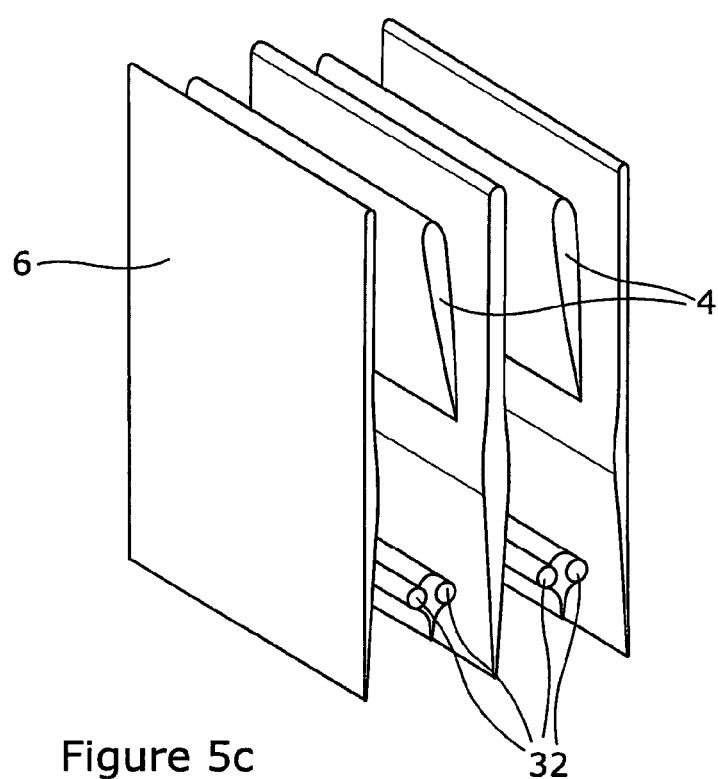
Figure 6A:
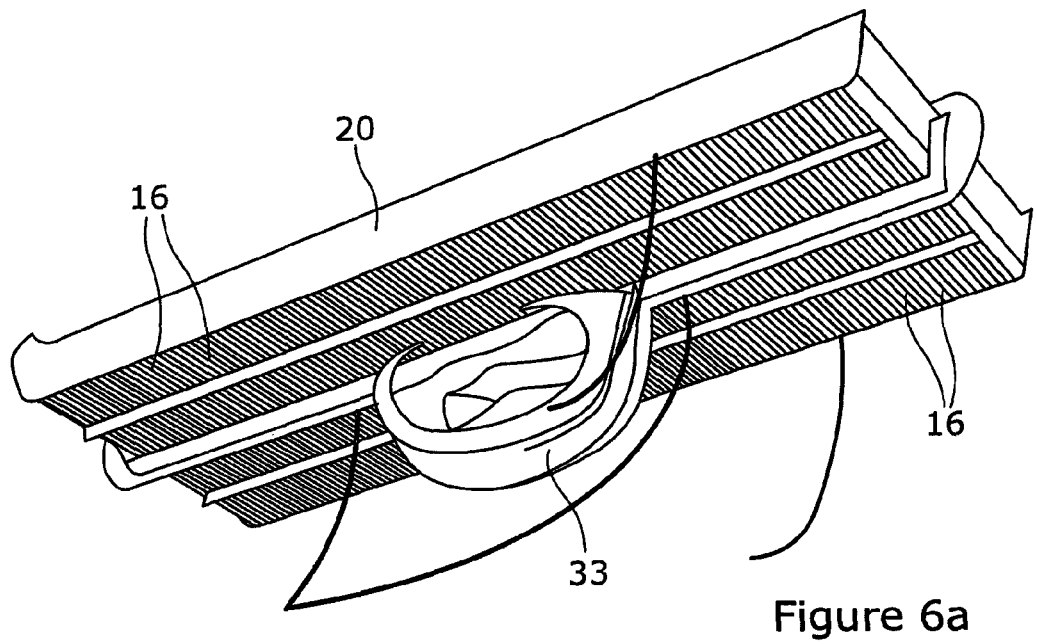
Figure 6B:
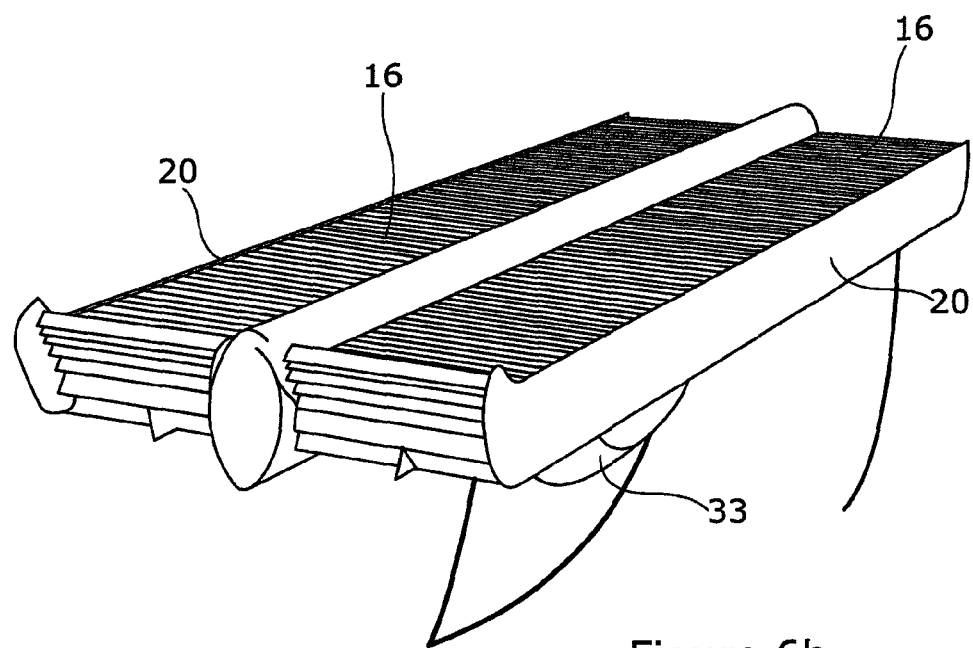
Figure 7A:
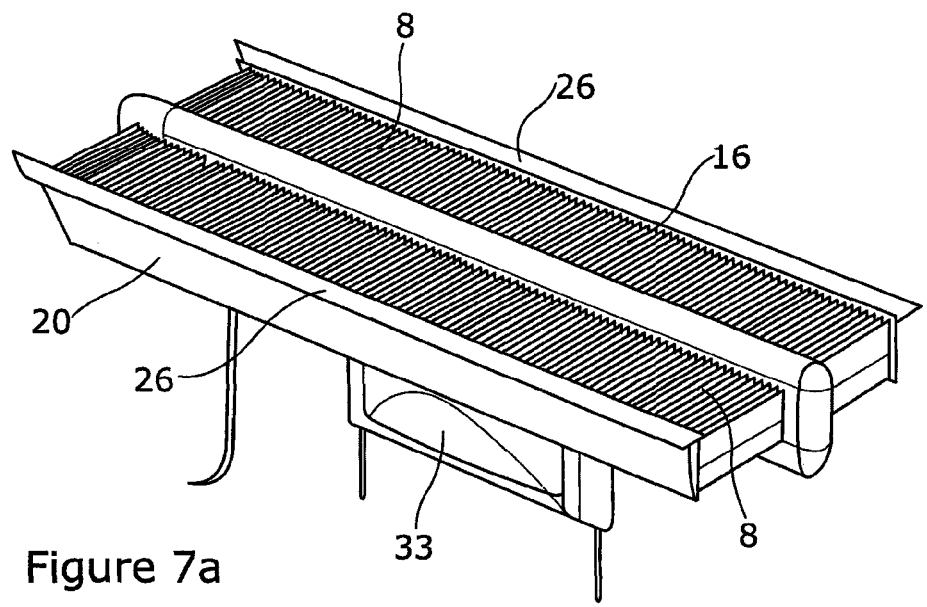
Figure 7B:
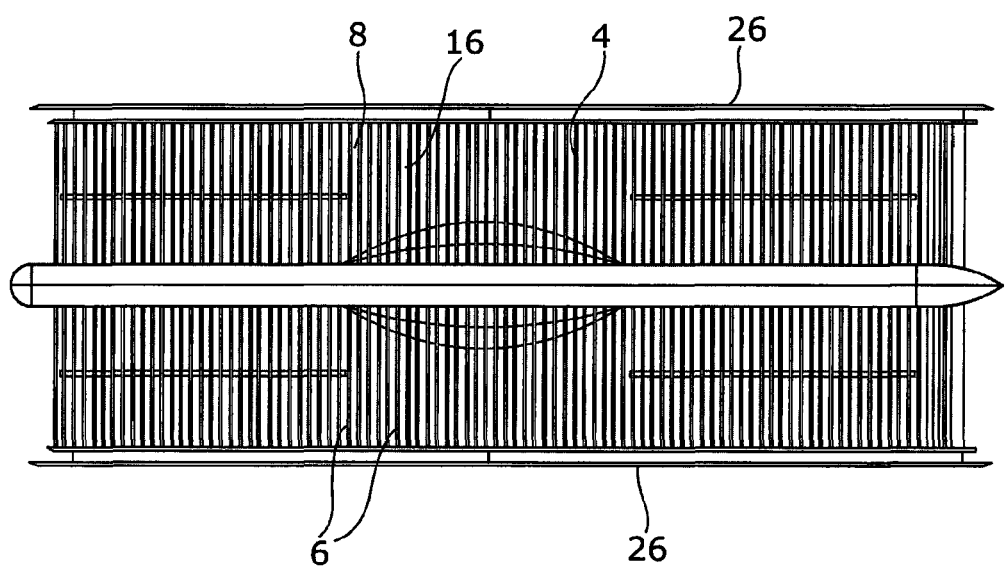
Figure 8A:
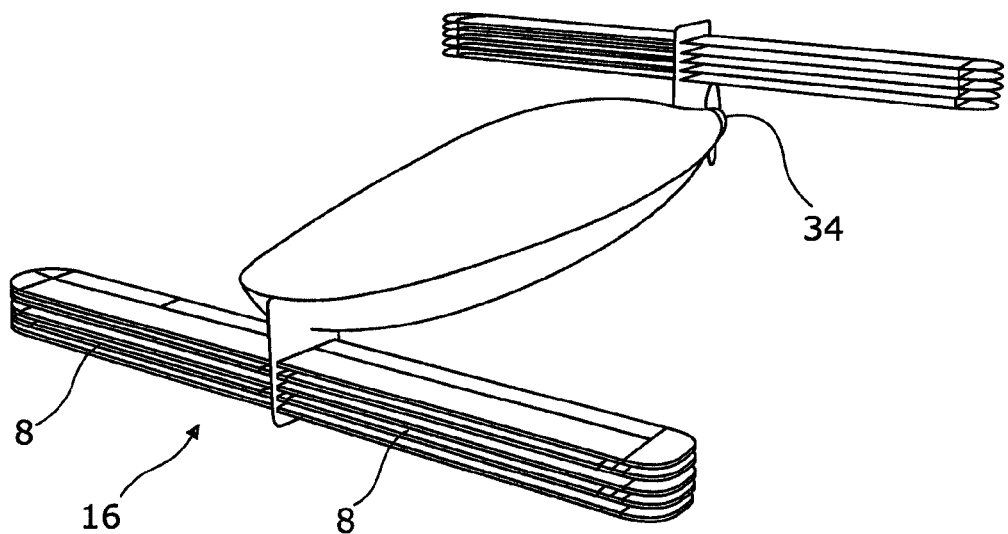
Figure 8B:
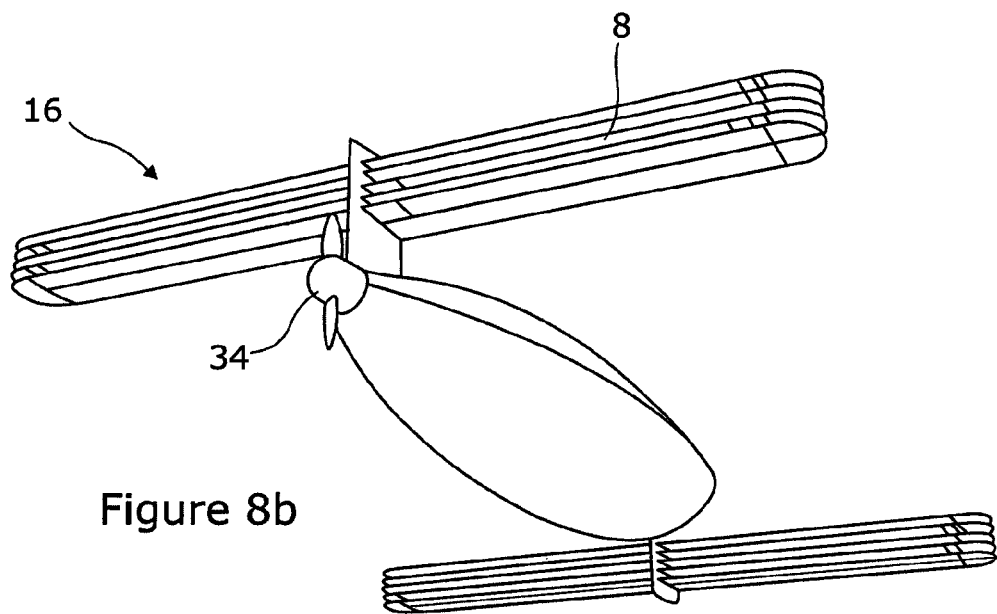
Figure 11:
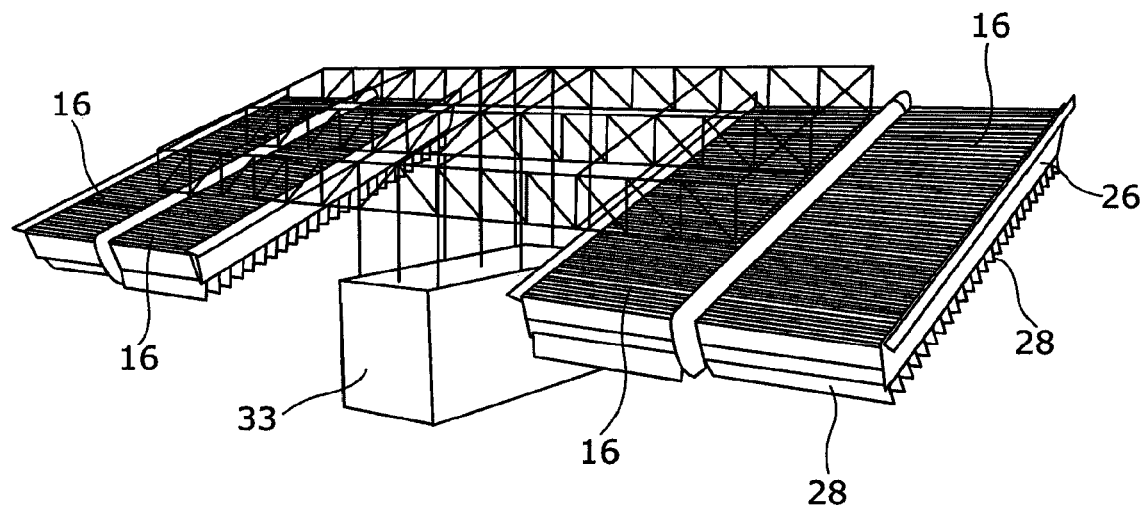
Figure 12:
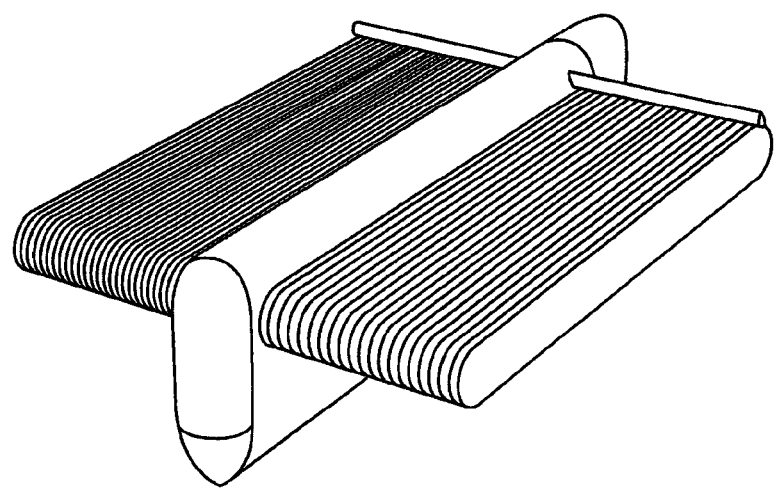
Figure 13A:
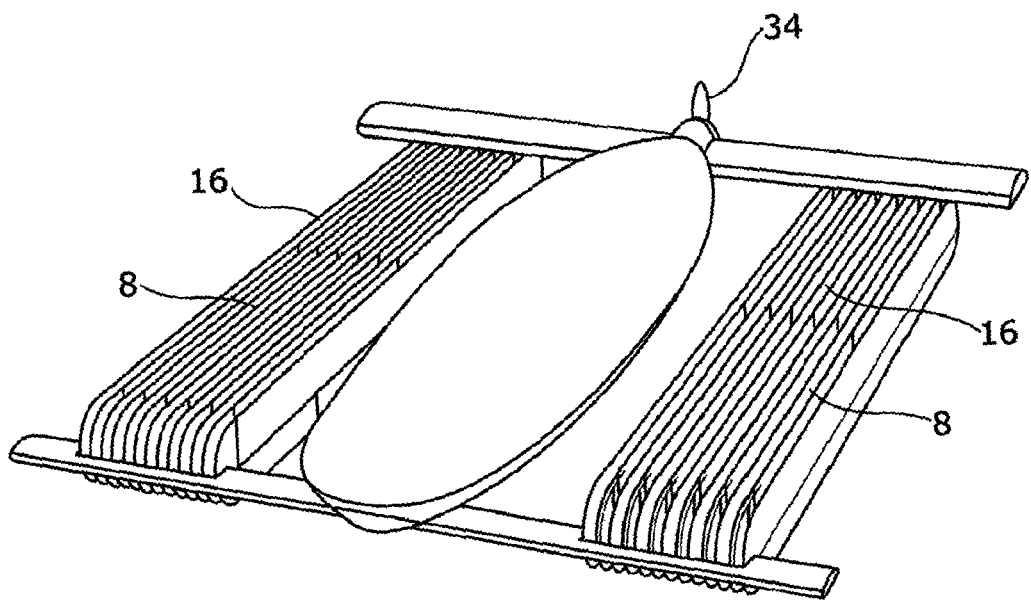
Figure 13B:
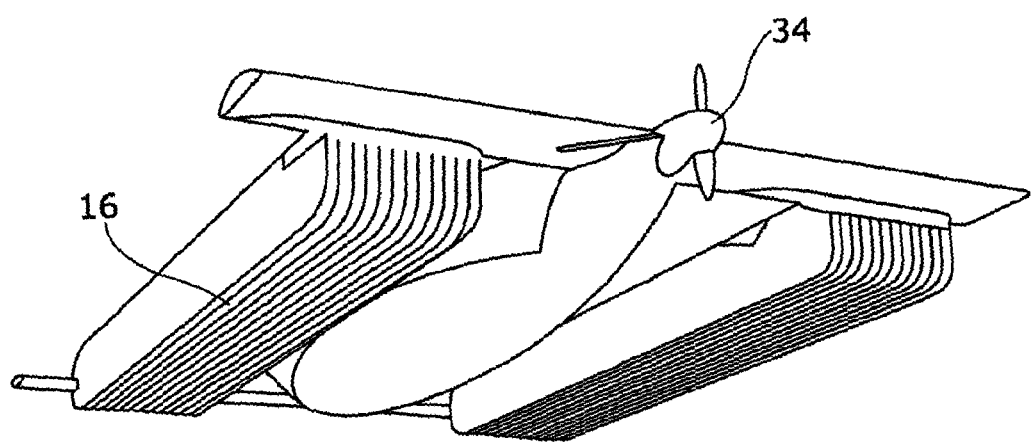
Figure 14A:
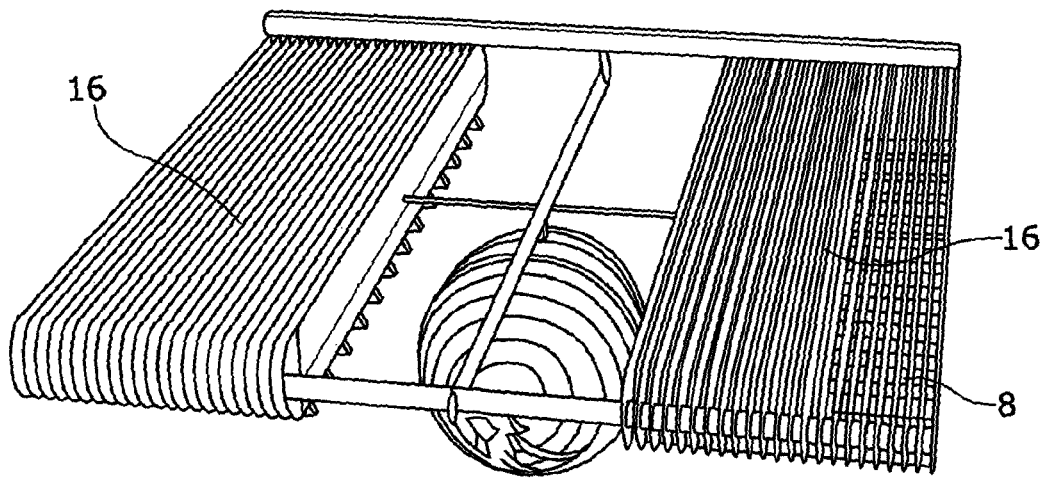
Figure 14B:
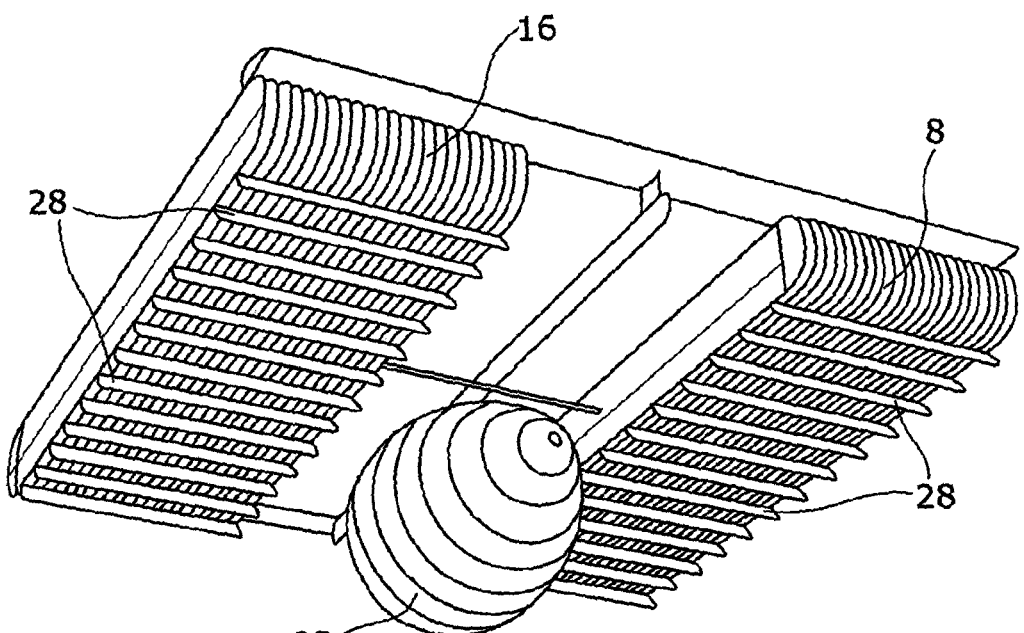

The thrust producing jet created at the trailing edge of the wing can be increased in strength, in the presence of a duct wall 6, for the same frequency. Because the duct walls experience a similar change in pressure on their surface to that on the wing (depending on their proximity) they help reduce the flapping frequency (for a given thrust), and the need for more moving parts for a given thrust. The walls effectively cause the wing to act as if the amplitude has been increased. They can also perform the function of a wing spar, wing box or as part of the fuselage (reducing weight and complexity) and help shield the flapping wings from objects on the ground and from people. FIG. 1c shows a preferred duct wall arrangement.

The use of an array 16 of wing 4 and duct 8 combinations can help to keep a desirable pressure distribution on the rearwards facing sides of the assembly when it is in forward motion. This is because the pressure within the duct helps prevent boundary layer separation.

The distance between the duct leading edge 22 and the leading edge 24 of the flapping wing may affect the pressure on the rear facing surfaces in horizontal flight and so needs to be taken into consideration, especially in relation to the cruise speed. This is due to the variations in pressure caused by the flapping action and constraints imposed by the duct walls 6.

The flapping wings 4, and ducts 8, help overall efficiency by acting as conventional (boundary layer controlled) wings in forward flight. An array 16 is needed to allow an efficient sizing of the wing chord and duct width in relationship to the frequency and with regards to control and redundancy. It also allows for a number of ducts of a length that would not create torque problems (due to the flapping motion) or a duct length that would create drag and control problems at the foremost and rearmost duct walls. Increasing the number of wing ducts 8 per area will increase the thrust distribution and, in the correct proportion, can help efficiency, noise, safety and control.

In one embodiment, the leading edge of the wing 4 must be designed to transmit torque in equal parts down the length of the wing. Since this feature requires a sizeable width it is advantageous to have the leading edge of the flapping wing 4 used as the lift producing surface and for the flapping wing 4 to have a taper that helps define the divergence of the duct 8. This also helps the structure of the wing to remain lightweight since the geometry is suited to preventing the deformation of the wing under the strain produced by both the air and the wing's own inertia.

A flexible wing trailing edge could be used to increase chord without increasing the amplitude, this can be increase efficiency since it increases the portion of the wing that is in close proximity to the wall. The trailing edge of either wing (static and flapping) can be serrated or otherwise shaped to reduce noise as shown in FIG. 3.

Changes in duct wall 6 geometry can be made to help reduce vorticity or leading edge vortices created on the stator wing 14 or to help even the jet velocity across the duct.

Different types of actuators, such as piezoelectric actuators or linear motors attached to the wing trailing edge or to a lever located above the wing, could be used instead of the motor and wing leading edge spindle. Changes in duct 8 geometry (which do not necessarily change the aerodynamic principles of operation) can be made such as having a tapering or straight duct and 'two-dimensional' flapping element.

The ducts 8 and wings 4 can be used to increase efficiency in forward flight by behaving in the same way as a 'circulation control' wing, in which the onset of stall is delayed by preventing boundary layer separation.

An array 16 can be combined with conventional propulsion to achieve greater cruise speeds. A large array 16 of wing/ducts would be able to use the flapping wings to extract energy from the air, (a similar effect to helicopter auto rotation) to act as a 'built in' means of slowing the descent of the aircraft and so act in the role of a parachute.

A strip of material 26 located outside and towards the top of the end plates 20 will help to reduce control problems arising from side winds. This is because the gap between the strip of material and the endplates prevents the side wind from being drawn directly into the duct. A side wind drawn directly into the duct 8 would create a lift force over the edge, which could change abruptly if a stall occurs. A thinner sideplate 20 leading edge would also help with this problem since less lift would be able to develop on a thinner surface.

Vanes 28 placed beneath the array 16 can be used for control or propulsive purposes and also for causing the jet to diverge in such a way that the downwash is more spread out, to help avoid ground disturbance. In a preferred embodiment the fuselage and/or endplates can also be shaped for control purposes.

The length of the ducts 8 (and consequently the proportions of the whole wing duct) can be shortened towards the front and/or rear of the array 16 in order to reduce the drag and forces created by the foremost and rearmost duct walls 6.

A set of diverging ducts (with or without flapping wings and stators), radially positioned, can be used to reduce drag and control problems at the rear of the array. As the number of these ducts increase (the angle of divergence is limited by the onset of flow separation so multiple wings are needed), the duct walls have gradually less angle of attack compared to the freestream in cruise and so create less drag and control problems.

To aid with landing, especially unpowered landings, an undercarriage 30 has been designed to help reduce airspeed in the final part of the descent. This consists of a single, or number, of struts that can pass through the front and back of the cabin and can go through the fuselage as necessary to provide extra length for more deceleration time. Air damping, springs or any appropriate method can be used to provide the necessary suspension. The undercarriage elements are preferably independent of each other to help provide stability on uneven ground.

In a preferred embodiment a cabin 33 is located beneath the central fuselage and streamlined to reduce drag. This location is preferred in order to locate the centre of gravity near the centre of the lifting/thrust surfaces and to enable easy access.

Figure 15A:
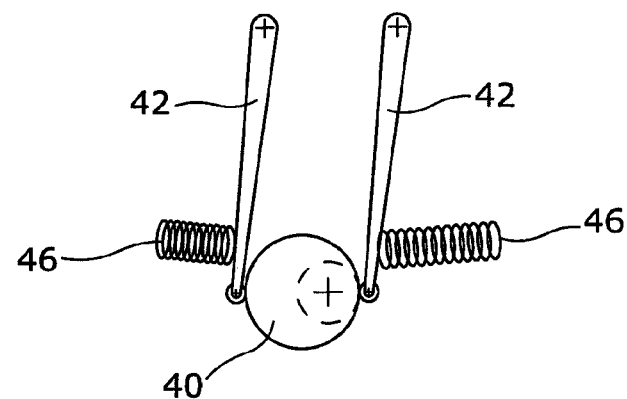
Figure 15B:
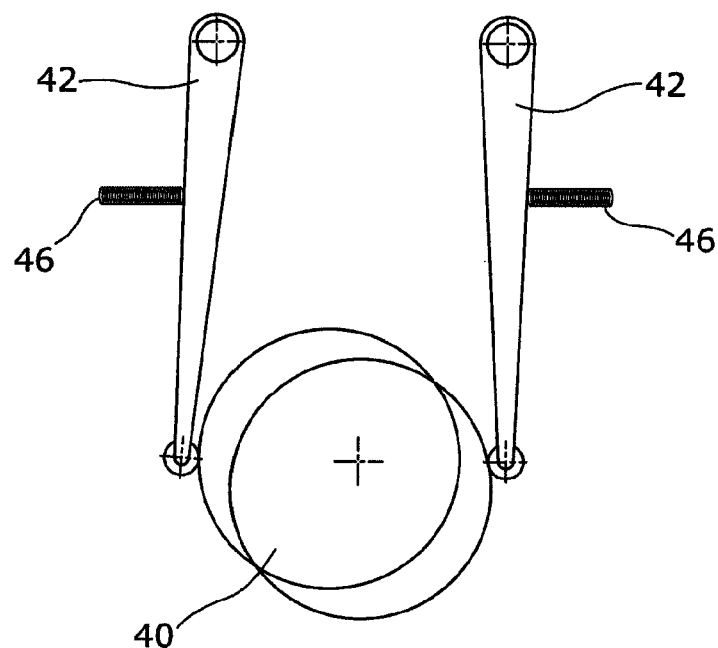
Figure 15C:
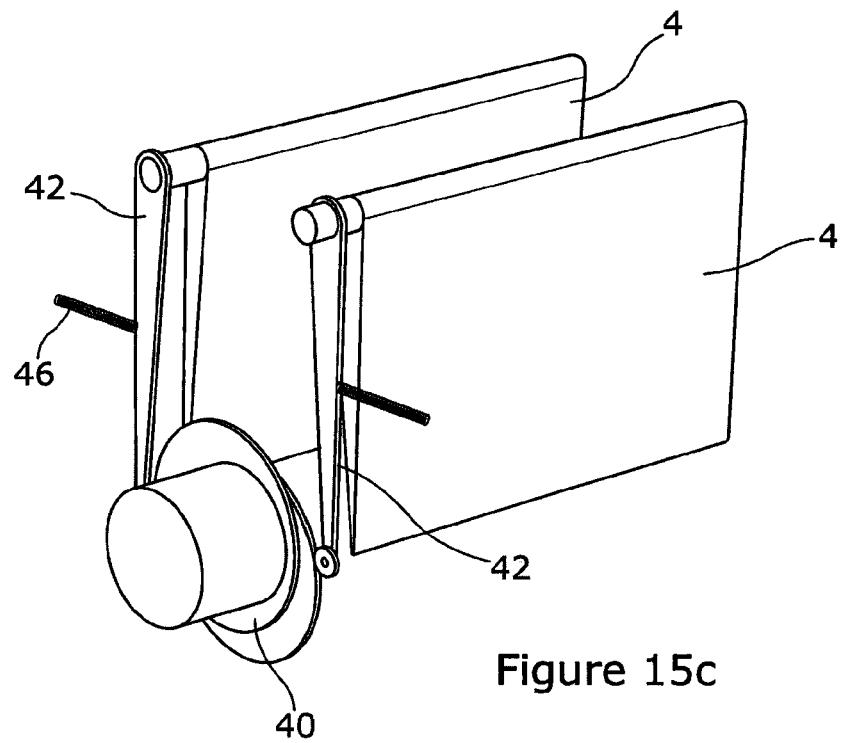
Figure 16:
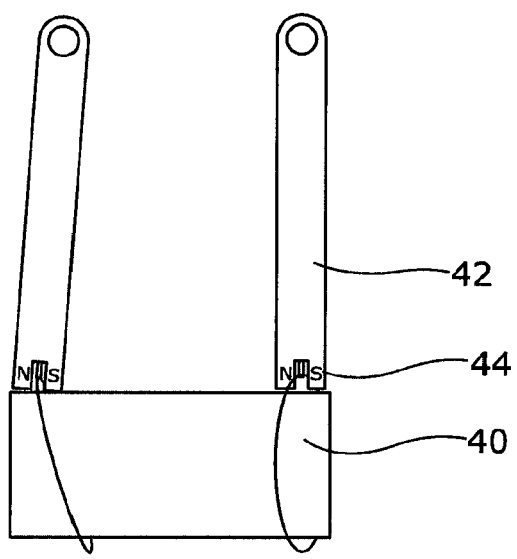
Figure 17A:
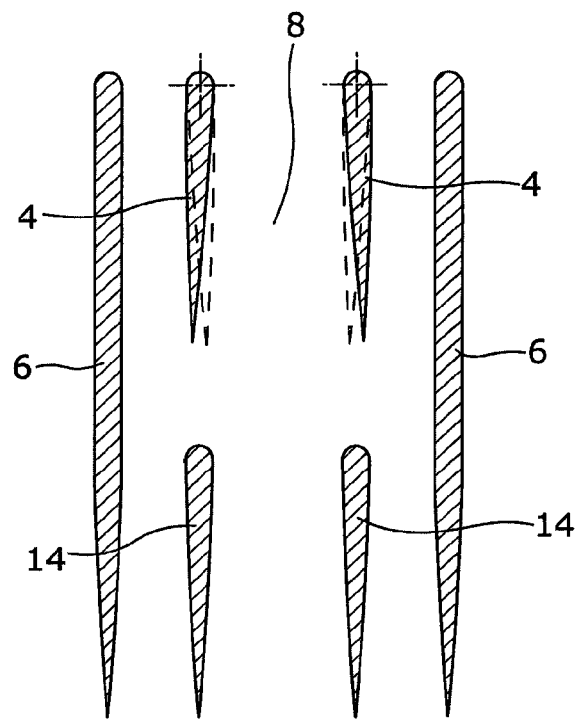
Figure 17B:
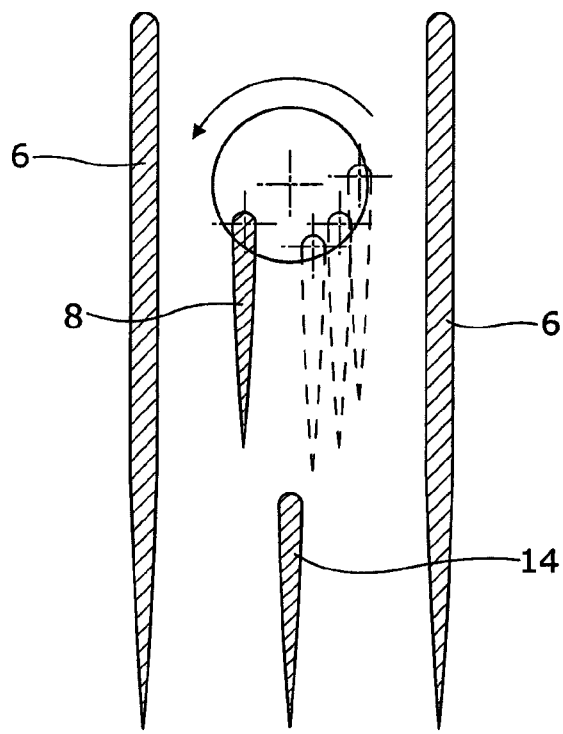
Figure 17C:
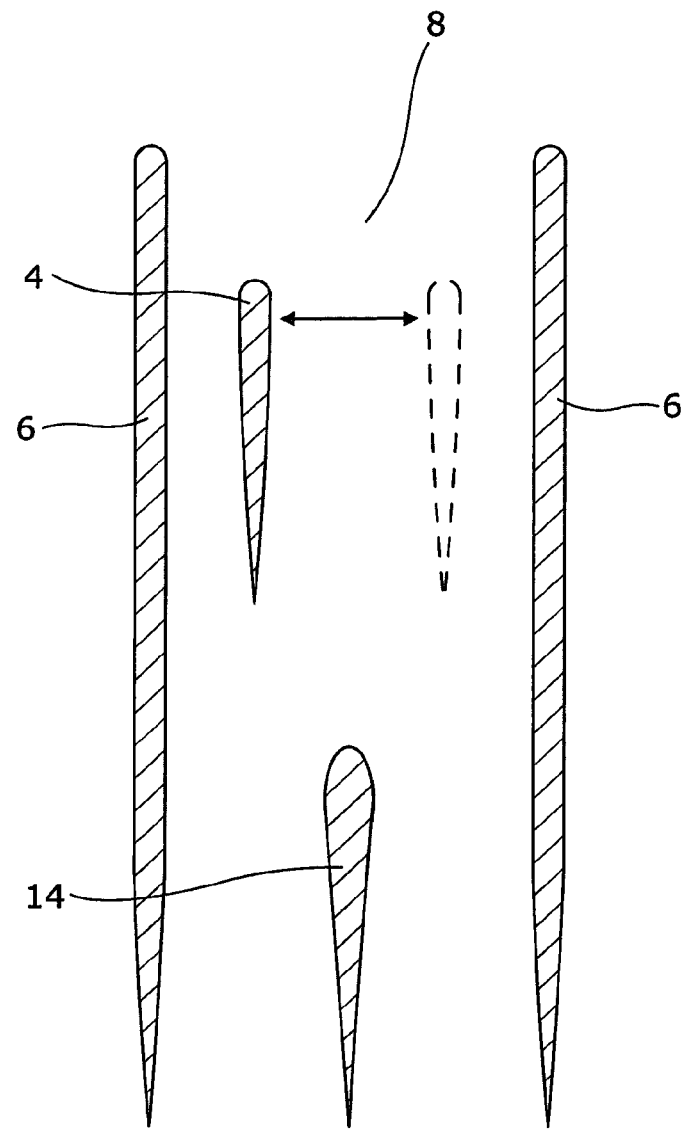
Figure 18:
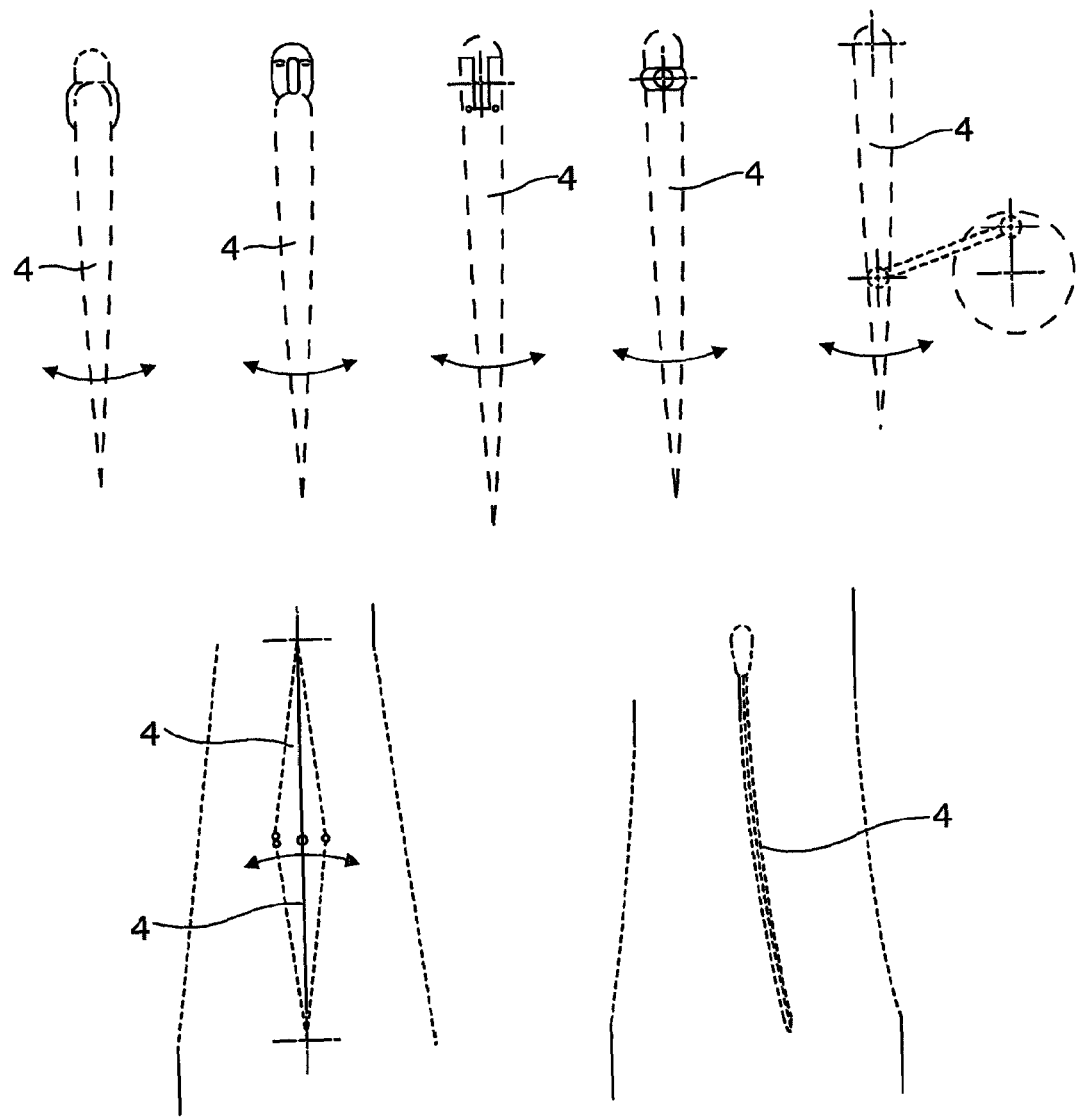
Figure 20A:
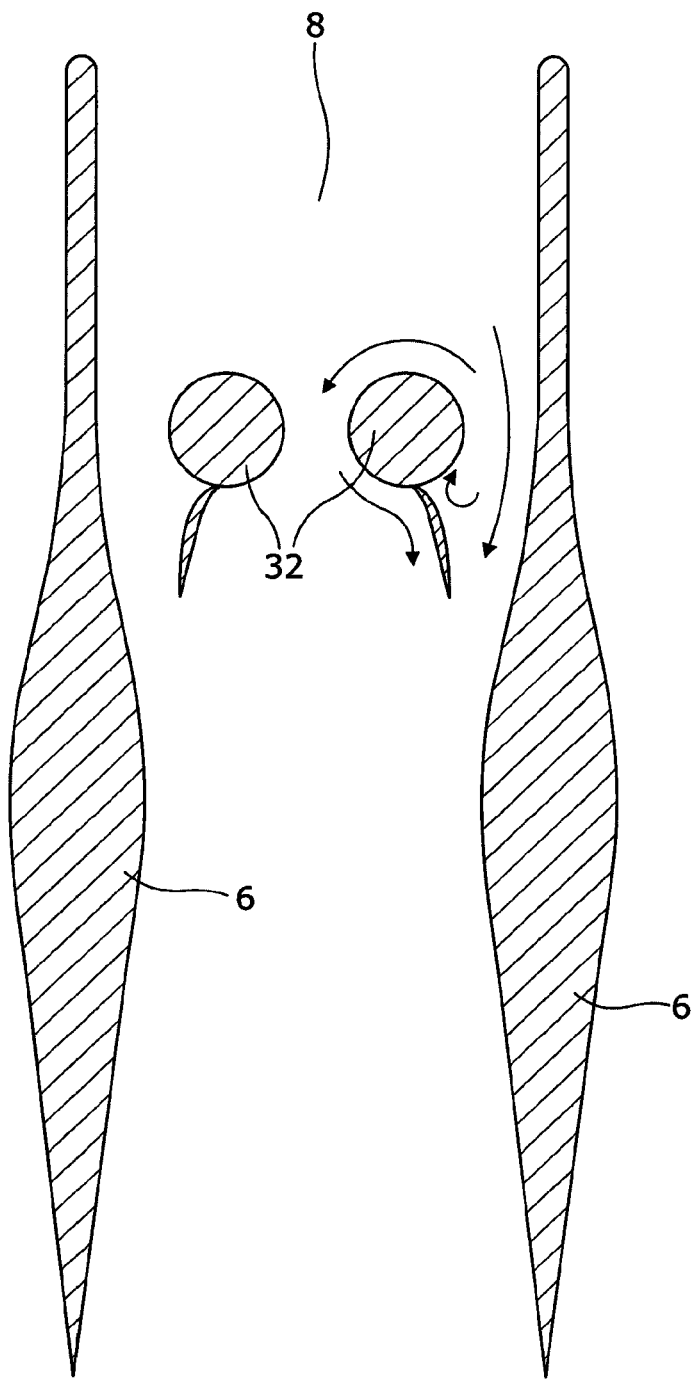
Figure 21A:
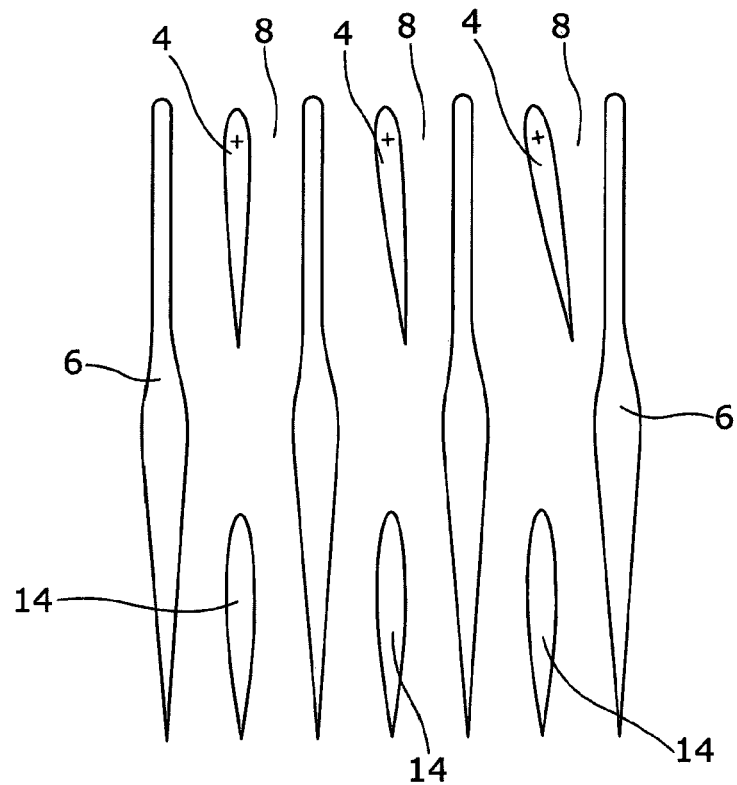
Figure 21B:
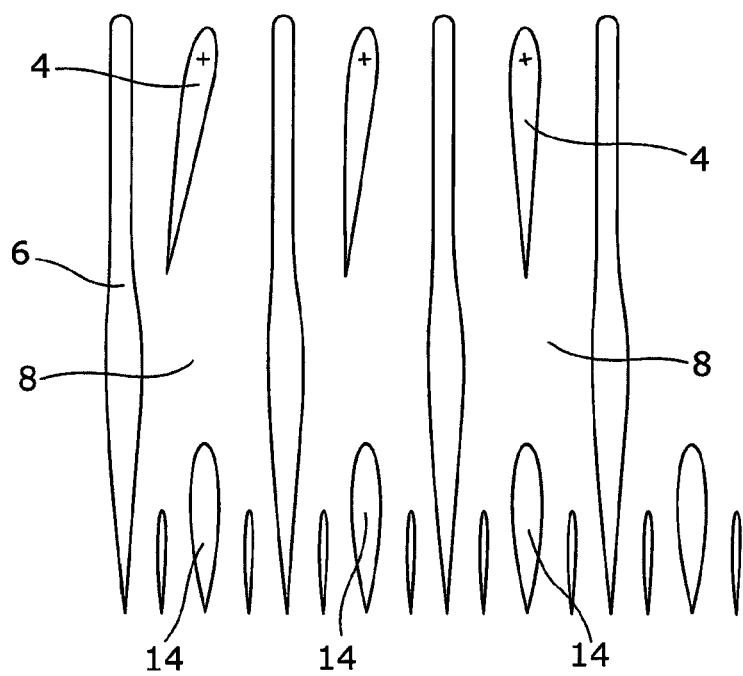
Figure 22A:
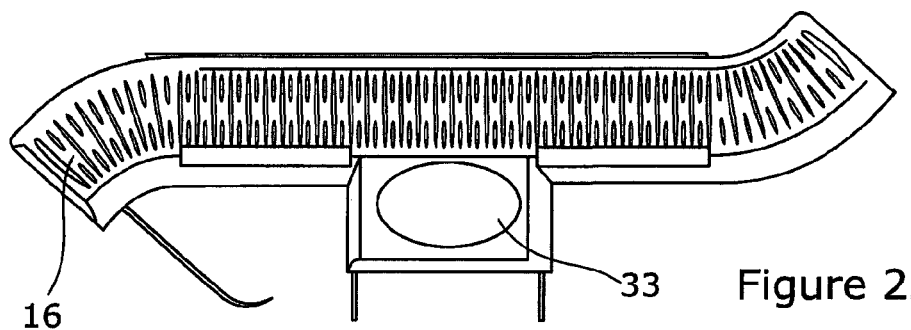
FIGS. 22a-32 illustrate views of aircraft utilising a propulsion system, in accordance with embodiments of the present invention.
Figure 22B:
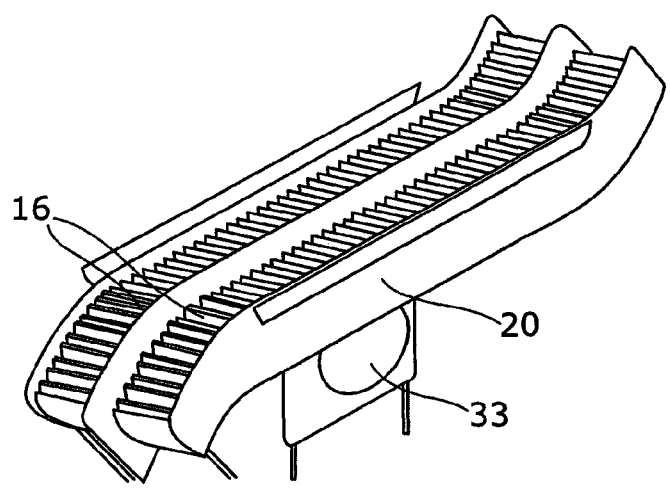
Figure 22C:
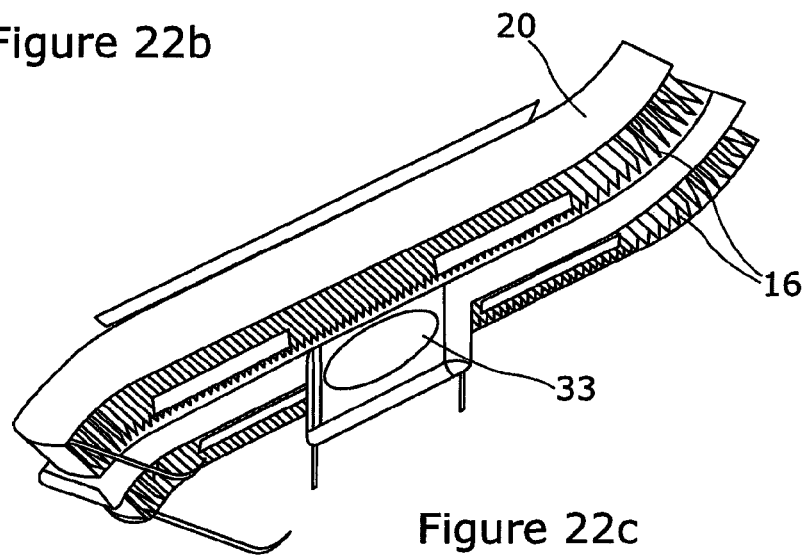
Figure 23A:
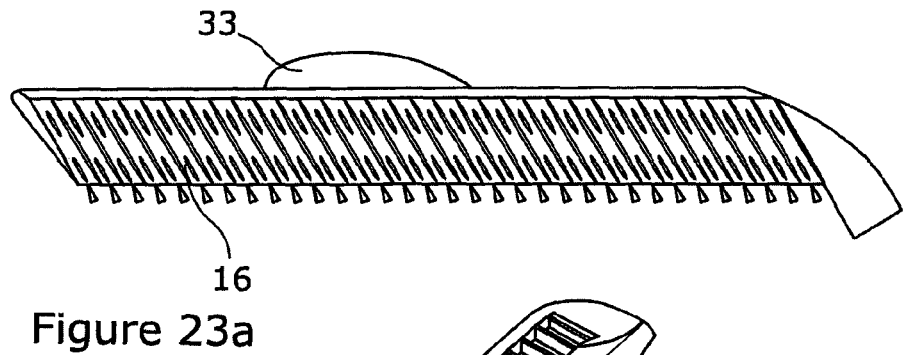
Figure 23B:
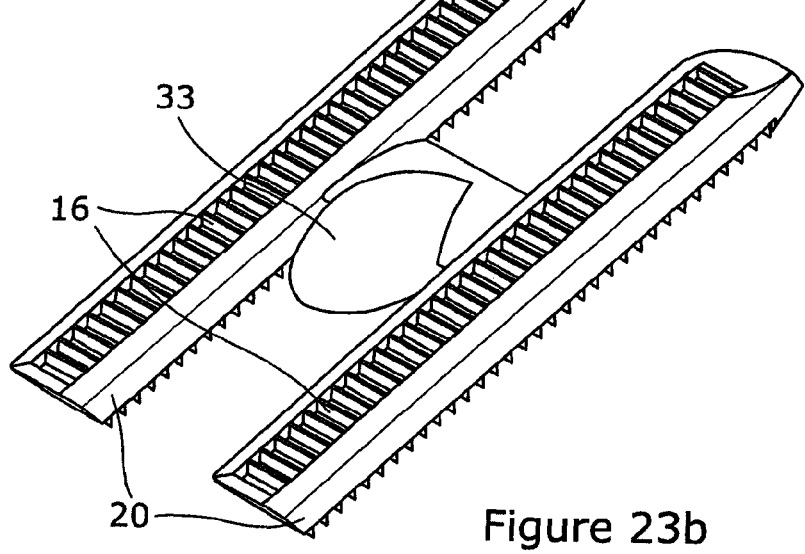
Figure 23C:
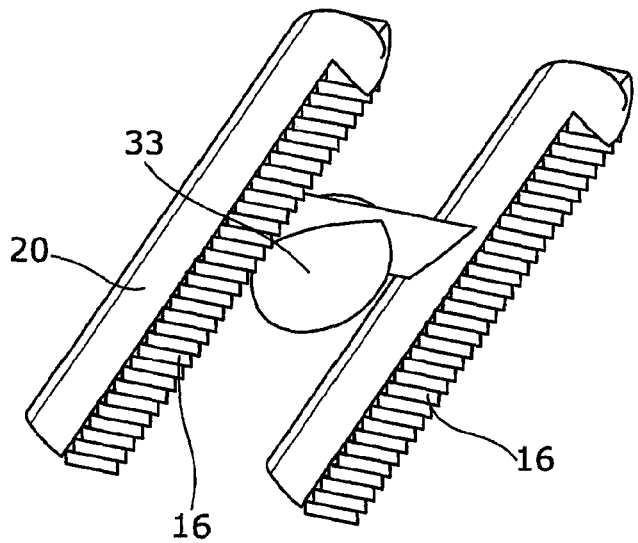
Figure 24A:
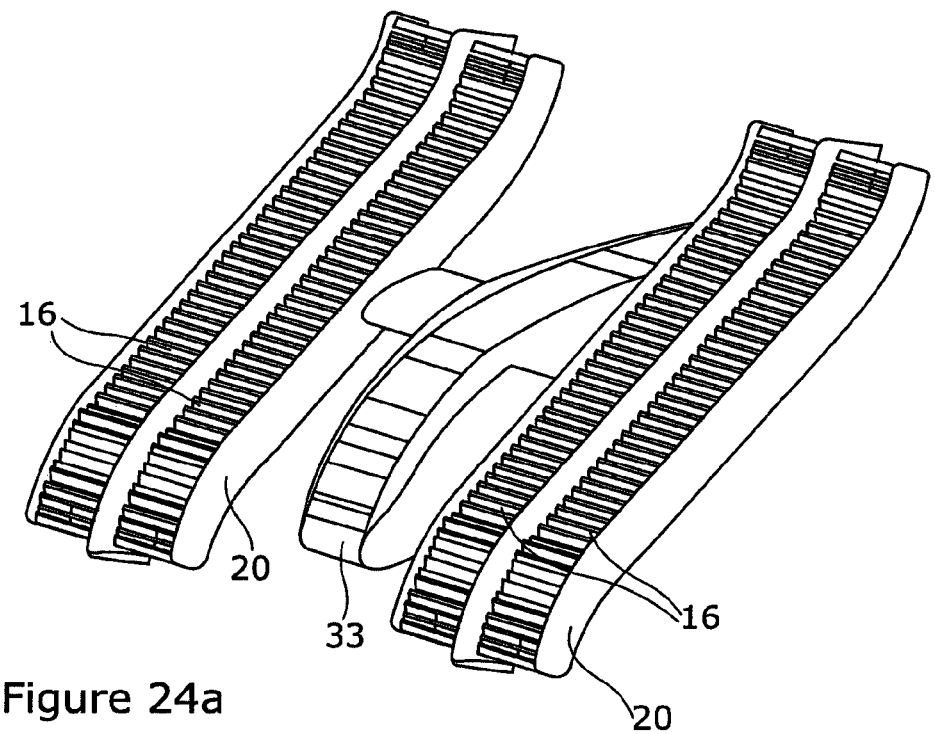
Figure 24B:
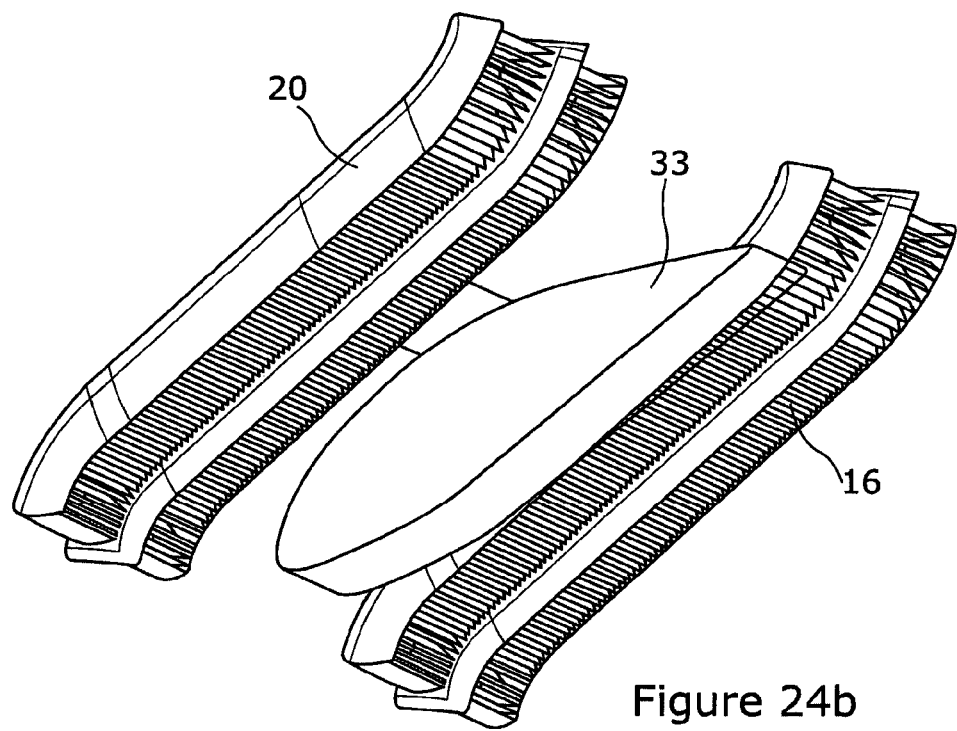
Figure 25:
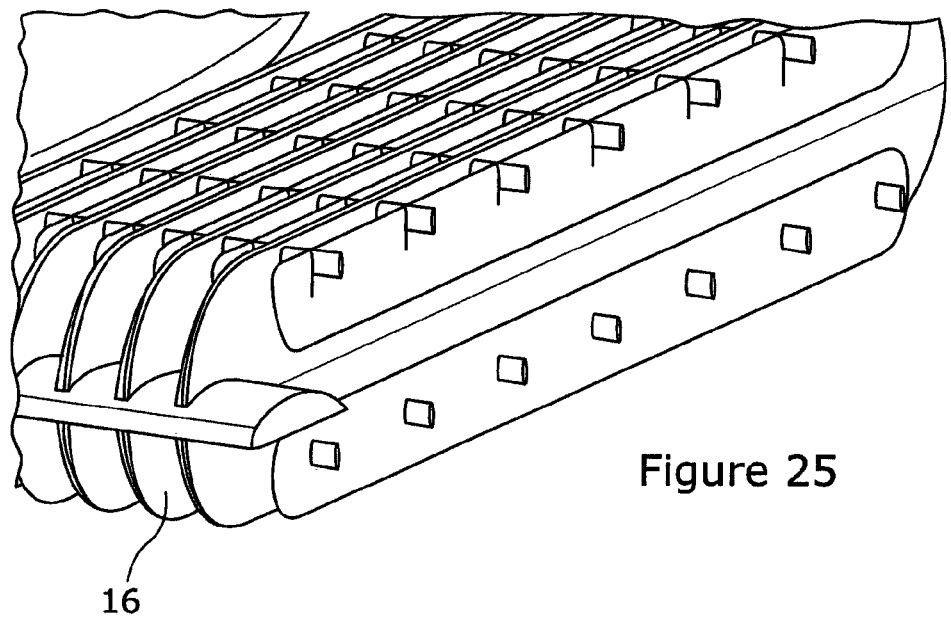
Figure 26:
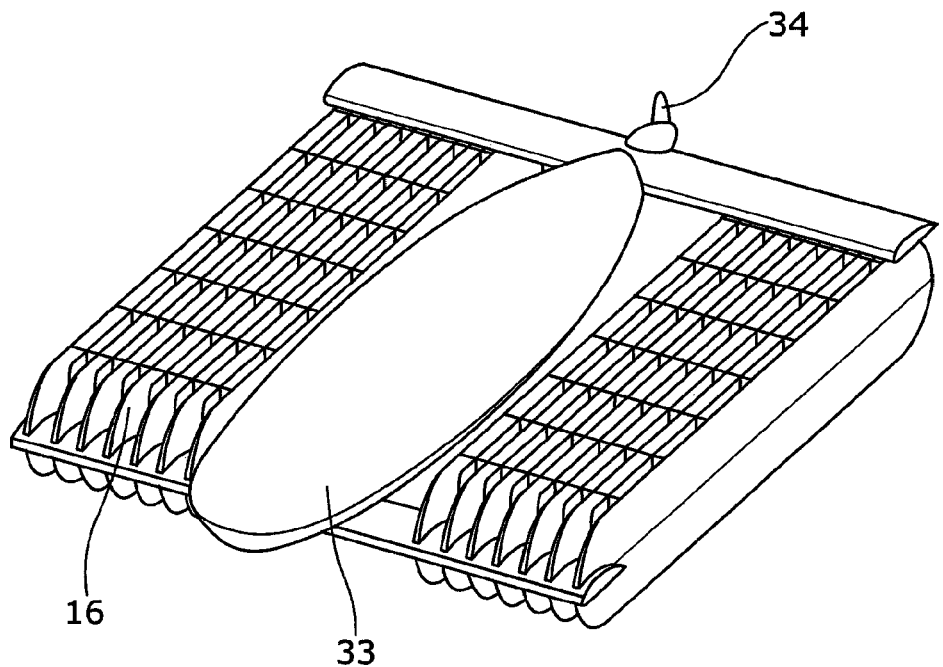
Figure 27A:
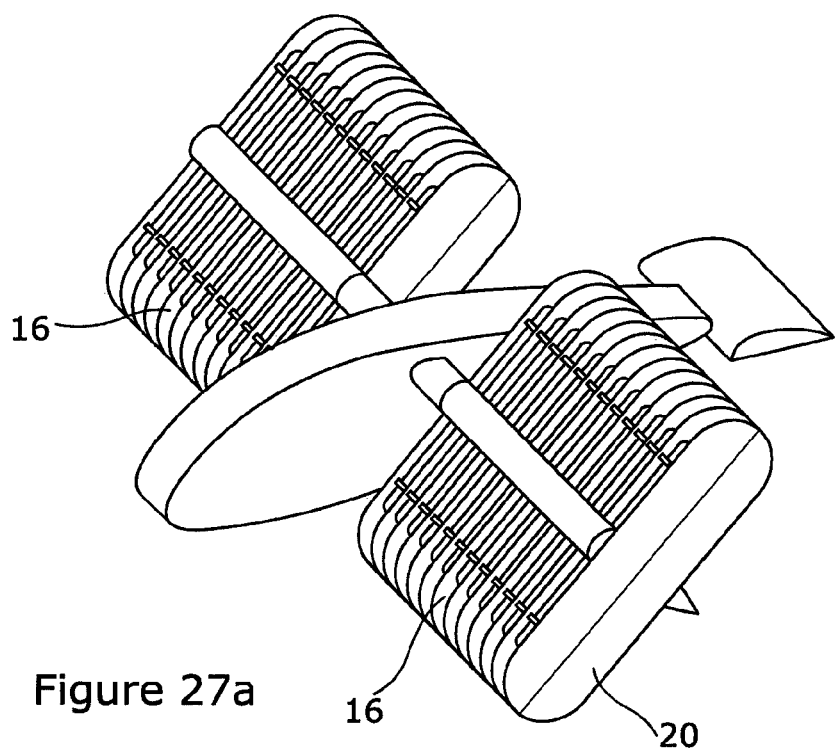
Figure 27B:
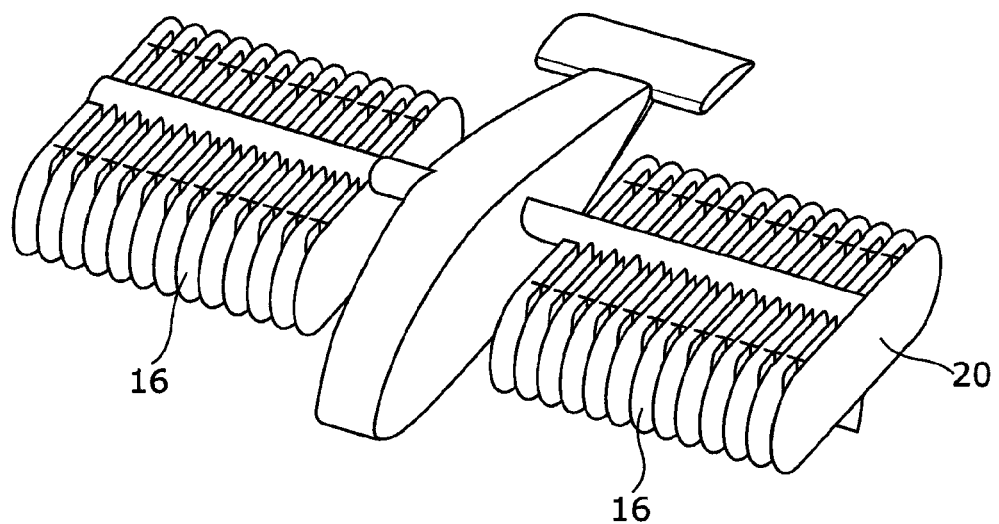
Figure 28:
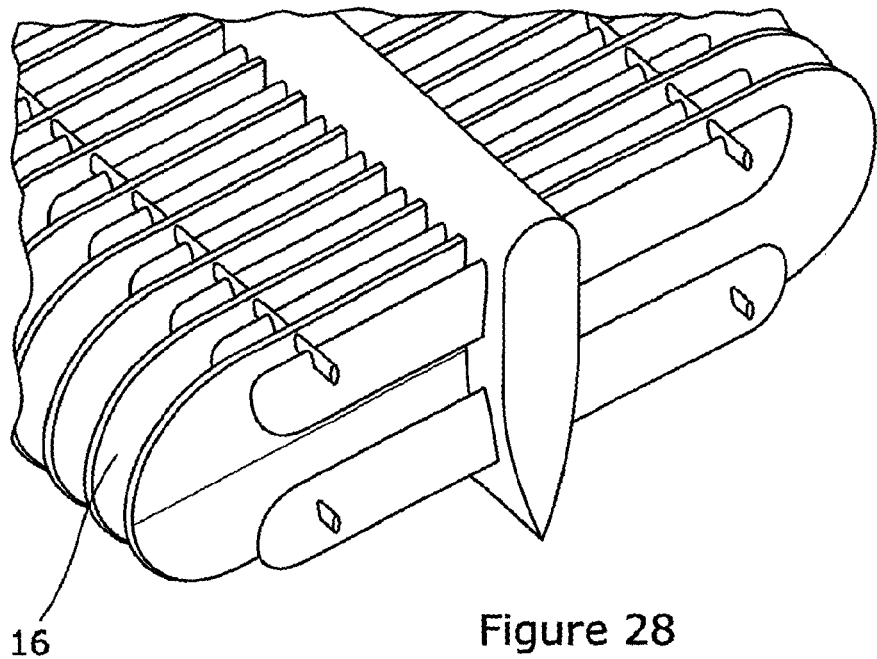
Figure 29:
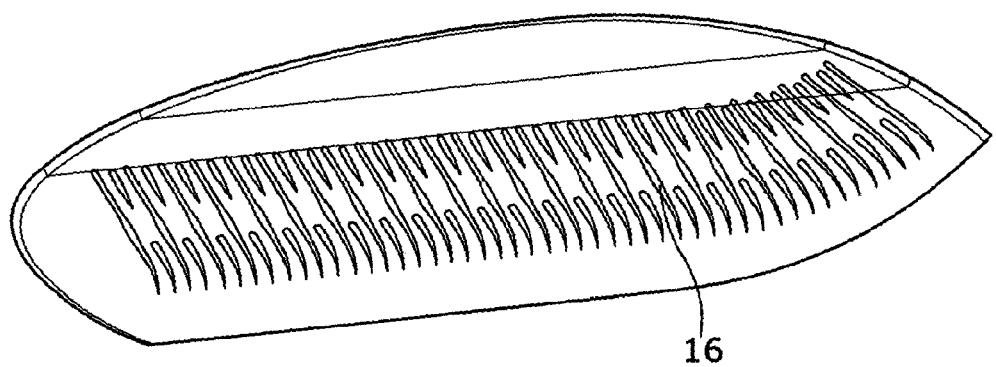
Figure 30A:
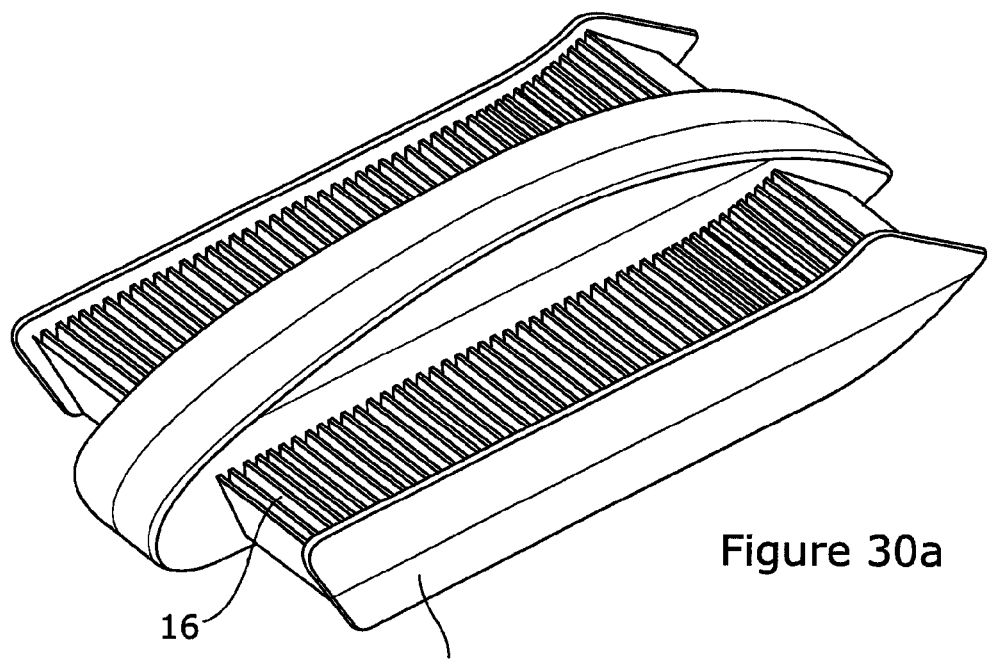
Figure 30B:
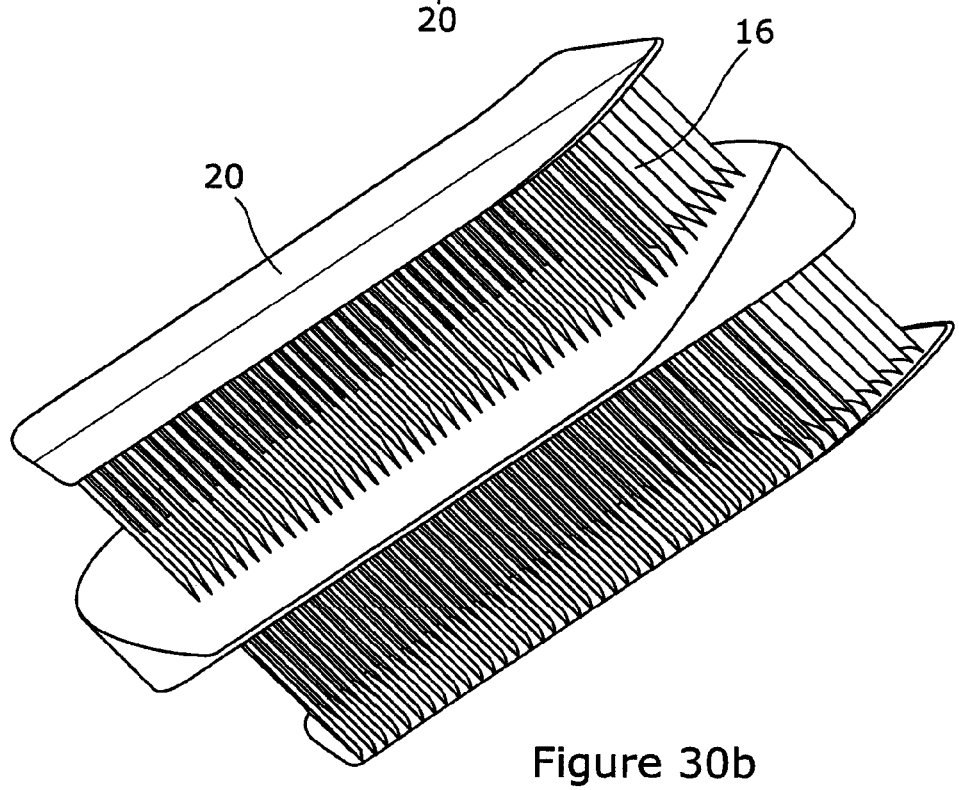
Figure 31A:
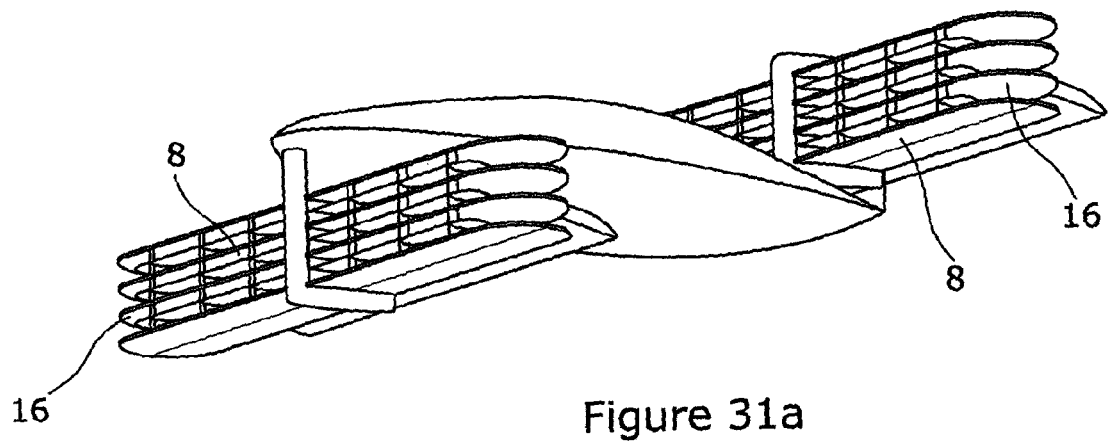
Figure 31B:
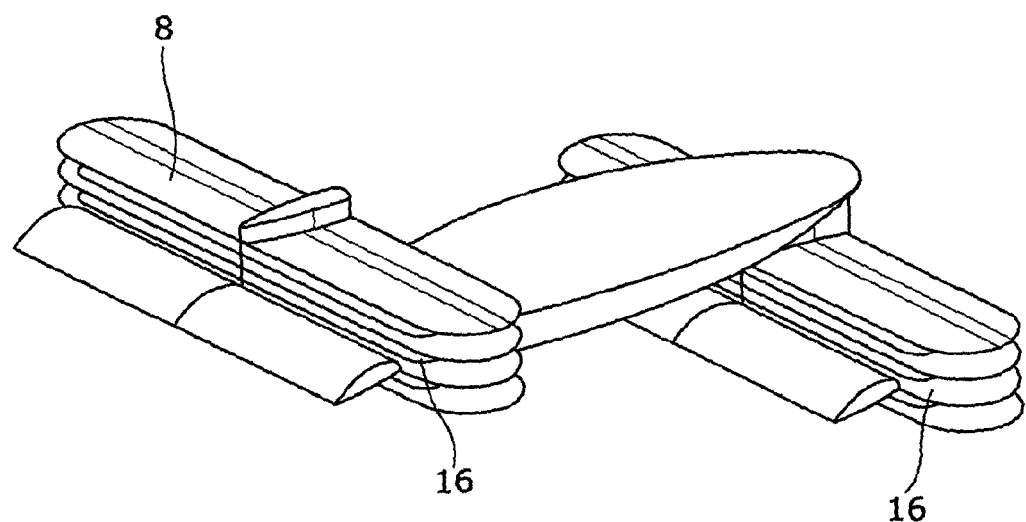
Figure 32:
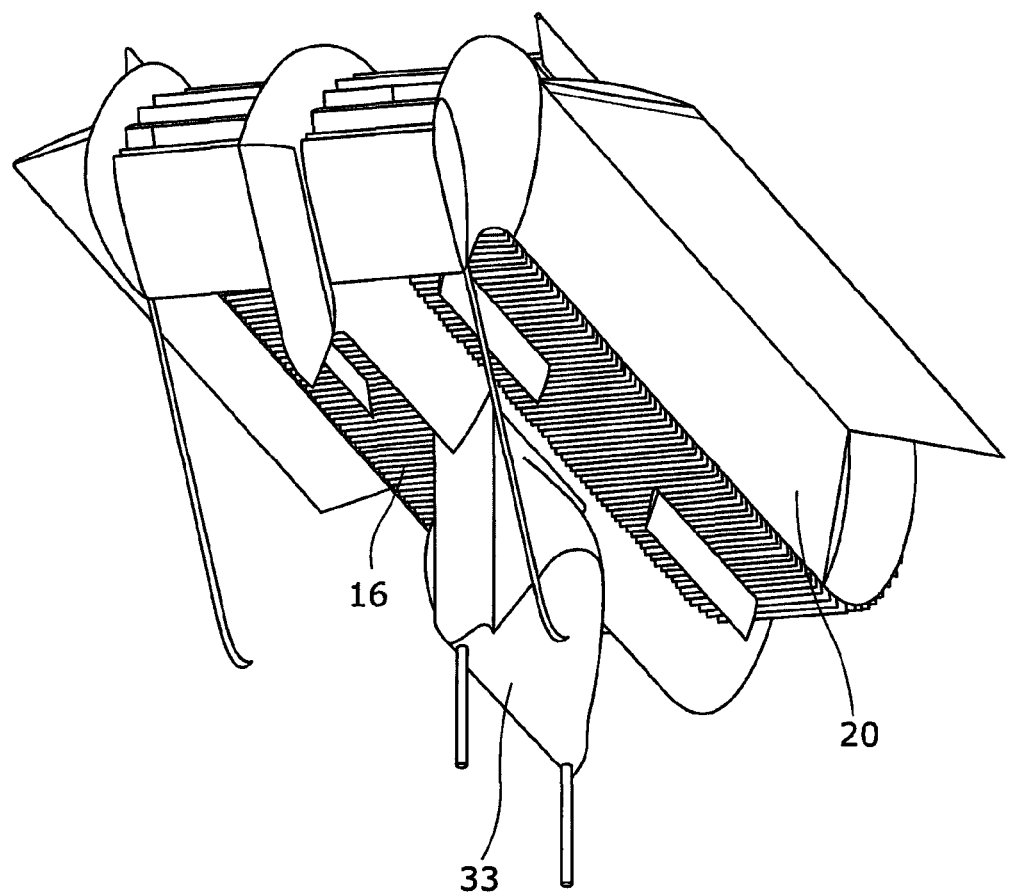

Turning now to FIGS. 15*a*-16, where there are shown cam 40 and crankshaft 42 arrangements to driving the waving or flapping portion of the wings 4. In a preferred embodiment shown in FIG. 16, the crankshaft 42 has a pair of permanent magnets at one end of the same which work with the cam as a conductor disc to create an electrodynamic bearing. There is little or no friction in this cam/bearing arrangement and avoids the need for roller/ball bearings and/or springs 44 as shown in FIG. 15.

The invention claimed is:

1. A propulsion system for an aircraft, said system including one or more thrust producing portions, wherein said one or more thrust producing portions include one or more duct means, said duct means at least partially formed or defined by two or more substantially parallel wall members, characterized in that at least one flapping or waving wing member is at least partially located or positioned substantially within said one or more duct means wherein the flapping or waving motion of the at least one wing member creates thrust, enabling the aircraft to fly in use, wherein at least a first or further thrust producing portions include a plurality of substantially parallel wall members, said wall members at least partially defining a plurality of duct means, wherein the plurality of ducts is arranged in an array, including at least one row and/or at least one column, and wherein the thrust producing portions and/or array of duct means are selectively movable.

2. A propulsion system according to claim 1 wherein the duct means wall members at least partially define an air inlet into the duct means and/or an air outlet out of the duct means.

3. A propulsion system according to claim 2 wherein the flapping or waving wing member is located entirely within the duct substantially between the inlet and outlet.

4. A propulsion system according to claim 1 wherein the flapping or waving wing member is a substantially symmetric or symmetrical aerofoil.

5. A propulsion system according to claim 4 wherein the flapping or waving wing members include front or leading edges positioned at and/or substantially towards the duct means inlet, and trailing or rear edges positioned or orientated such that the trailing or rear edges are substantially downstream of the inlet and leading wing edge, substantially towards and/or at the duct means outlet.

6. A propulsion system according to claim 5 wherein the trailing edges are deformable and/or flexible.

7. A propulsion system according to claim 5 wherein the trailing edges are serrated.

8. A propulsion system according to claim 1 wherein the wall members substantially defining the duct means or walls defining the plurality or array of duct means are spaced substantially equidistantly.

9. A propulsion system according to claim 8 wherein the wall member or surfaces thereof taper and/or diverge.

10. A propulsion system according to claim 8 wherein the distance between adjacent wall members, or surfaces thereof, reduce and/or taper substantially at or around a region downstream of the flapping or waving wing member.

11. A propulsion system according to claim 1 wherein at least one of the thrust producing portions are positioned in a horizontal or substantially horizontal plane.

12. A propulsion system for an aircraft, said system including one or more thrust producing portions, wherein said one or more thrust producing portions include one or more duct means, said duct means at least partially formed or defined by two or more substantially parallel wall members, characterized in that at least one flapping or waving wing member is at least partially located or positioned substantially within said one or more duct means wherein the flapping or waving motion of the at least one wing member creates thrust, enabling the aircraft to fly in use, wherein at least one of the thrust producing portions are positioned in a vertical or substantially vertical plane, and wherein thrust producing portions located or positioned substantially perpendicular to the oncoming airflow act as conventional wings with a circulation control element.

13. A propulsion system according to claim 12 wherein the duct means wall members at least partially define an air inlet into the duct means and/or an air outlet out of the duct means.

14. A propulsion system according to claim 12 wherein the flapping or waving wing member is a substantially symmetric or symmetrical aerofoil.

15. A propulsion system according to claim 12 wherein at least one of the thrust producing portions are positioned in a horizontal or substantially horizontal plane.

16. A propulsion system for an aircraft, said system including one or more thrust producing portions, wherein said one or more thrust producing portions include one or more duct means, said duct means at least partially formed or defined by two or more substantially parallel wall members, characterized in that at least one flapping or waving wing member is at least partially located or positioned substantially within said one or more duct means wherein the flapping or waving motion of the at least one wing member creates thrust, enabling the aircraft to fly in use, wherein the system includes at least one stator or static wing member located substantially downstream from the flapping or waving wing members, and wherein at least part of, or the entire, static wing member is located substantially outside the duct means, downstream from the outlet.

17. A propulsion system according to claim 16 wherein the static wing member is located substantially within the duct means.

18. A propulsion system according to claim 16 wherein the duct means wall members at least partially define an air inlet into the duct means and/or an air outlet out of the duct means.

19. A propulsion system according to claim 16 wherein the flapping or waving wing member is a substantially symmetric or symmetrical aerofoil.

20. A propulsion system according to claim 16 wherein at least one of the thrust producing portions are positioned in a horizontal or substantially horizontal plane.

* * * * *